(12) United States Patent
Meyer et al.

(10) Patent No.: US 9,503,148 B2
(45) Date of Patent: Nov. 22, 2016

(54) COMBINATION MOBILE PHONE PROTECTIVE CASE AND PORTABLE SAFE SYSTEM, APPARATUS AND METHOD

(71) Applicant: Phone Solutions, LLC, Slingerlands, NY (US)

(72) Inventors: Andrew J. Meyer, Slingerlands, NY (US); Ryan Scotto, Slingerlands, NY (US)

(73) Assignee: Phone Solutions, LLC, Slingerlands, NY (US)

( * ) Notice: Subject to any disclaimer, the term of this patent is extended or adjusted under 35 U.S.C. 154(b) by 0 days.

(21) Appl. No.: 15/092,569

(22) Filed: Apr. 6, 2016

(65) Prior Publication Data

US 2016/0218765 A1    Jul. 28, 2016

(51) Int. Cl.
| | |
|---|---|
| *H04M 1/00* | (2006.01) |
| *H04B 1/3888* | (2015.01) |
| *H04B 1/3827* | (2015.01) |
| *A45C 11/00* | (2006.01) |

(52) U.S. Cl.
CPC .............. *H04B 1/3888* (2013.01); *A45C 11/00* (2013.01); *H04B 2001/3855* (2013.01); *H04B 2001/3866* (2013.01)

(58) Field of Classification Search
CPC .............. H04B 2001/3855; H04B 2001/3866; H04B 2001/3894; H04B 1/3888; H04B 1/3877; A45C 11/00; A45C 2011/002; A45C 15/00; A45C 2011/003; A45C 2011/001; A45C 13/002; A45F 5/00
USPC ........... 455/575.8, 575.1, 90.3, 550.1, 556.1, 455/557, 11.1, 575.9
See application file for complete search history.

(56) References Cited

U.S. PATENT DOCUMENTS

| | | |
|---|---|---|
| 8,047,364 B2 | 11/2011 | Longinotti-Buitoni |
| 8,380,264 B2 | 2/2013 | Hung et al. |
| 8,381,904 B1 | 2/2013 | Longinotti-Buitoni |
| 8,395,894 B2 | 3/2013 | Richardson et al. |
| 8,442,604 B1 | 5/2013 | Diebel |

(Continued)

OTHER PUBLICATIONS

Combination lock—Wikipedia, the free encyclopedia from https://en.wikipedia.org/wiki/Combination_lock#Multiple-dial_locks (printed Mar. 30, 2016).

(Continued)

*Primary Examiner* — Fred Casca
(74) *Attorney, Agent, or Firm* — Jay R. Yablon

(57) ABSTRACT

An integrated mobile phone protective case and carrier drawer system for securely containing small personal items, comprising: a regular mobile phone protective case portion; a drawer space integrally contained inside a rear part of the integrated mobile phone protective case; a drawer cover separate from the integrated mobile phone protective case, configured to mate onto the rear part of the integrated mobile phone protective case; a latching extension integrally affixed with the drawer cover; a latch integrally affixed with the integrated mobile phone protective case and configured to latch together with the latching extension; and a release actuator for releasing the latching extension from the latch; wherein: after the drawer cover has been slid onto the integrated mobile phone protective case, the latching extension simultaneously becomes latched together with the latch thereby preventing any personal items contained within the personal item carriage drawer from being removed from the drawer.

21 Claims, 12 Drawing Sheets

(56) References Cited

U.S. PATENT DOCUMENTS

| | | | |
|---|---|---|---|
| 8,483,786 | B2 | 7/2013 | Ramies et al. |
| 8,509,864 | B1 | 8/2013 | Diebel |
| 8,718,729 | B1 | 5/2014 | Kershenstein |
| 8,757,376 | B2 | 6/2014 | Azzoni |
| 8,827,074 | B2 | 9/2014 | Law et al. |
| 8,879,773 | B2 | 11/2014 | Merenda |
| 8,923,938 | B2 | 12/2014 | Coughlan et al. |
| 8,958,857 | B1 | 2/2015 | Kennard |
| 8,971,975 | B2 | 3/2015 | Ramies et al. |
| 8,989,826 | B1 | 3/2015 | Connolly |
| 9,004,275 | B2 | 4/2015 | Lee |
| 9,031,623 | B2 | 5/2015 | Yoo |
| 2005/0277453 | A1 | 12/2005 | Kim |
| 2006/0121962 | A1 | 6/2006 | Kohli |
| 2007/0293288 | A1 | 12/2007 | Lin et al. |
| 2011/0136555 | A1 | 6/2011 | Ramies et al. |
| 2011/0294556 | A1 | 12/2011 | Carlberg et al. |
| 2013/0095898 | A1 | 4/2013 | Altschul et al. |
| 2013/0157730 | A1 | 6/2013 | McCormac et al. |
| 2013/0344925 | A1 | 12/2013 | Lu et al. |
| 2014/0051488 | A1 | 2/2014 | Chung |
| 2014/0057687 | A1 | 2/2014 | Yoo |
| 2014/0066142 | A1 | 3/2014 | Gipson |
| 2014/0148228 | A1 | 5/2014 | Altschul et al. |
| 2014/0162735 | A1 | 6/2014 | Oh et al. |
| 2014/0228082 | A1 | 8/2014 | Morrow et al. |
| 2014/0315603 | A1 | 10/2014 | Fathollahi et al. |
| 2014/0370945 | A1 | 12/2014 | Monti et al. |
| 2015/0018056 | A1 | 1/2015 | Gillikin |
| 2015/0141093 | A1 | 5/2015 | Sela |
| 2015/0156297 | A1 | 6/2015 | Crawford et al. |
| 2015/0172431 | A1 | 6/2015 | Huang |
| 2015/0236745 | A1 | 8/2015 | Tranchida et al. |
| 2015/0244407 | A1* | 8/2015 | Peral .................... H04B 1/3888 455/575.8 |
| 2015/0311937 | A1 | 10/2015 | Lee |
| 2015/0319274 | A1 | 11/2015 | McLoughlin |
| 2015/0365122 | A1* | 12/2015 | Kim ........................ H04M 1/21 455/575.8 |
| 2016/0028429 | A1 | 1/2016 | Crawford |
| 2016/0028430 | A1 | 1/2016 | Crawford |

OTHER PUBLICATIONS

Hotel Room Safes From Buy Hotel Safes—BuyHotelSafes.com from http://buyhotelsafes.com/?gclid=CKuZ2OfL6MsCFUgkhgod-7QFbg (printed Mar. 30, 2016).

Dorm, Hotel, and Patient Safes from http://www.wilsonsafe.com/#!dormhoteland-patient-room-safes/clig (printed Mar. 30, 2016).

\* cited by examiner

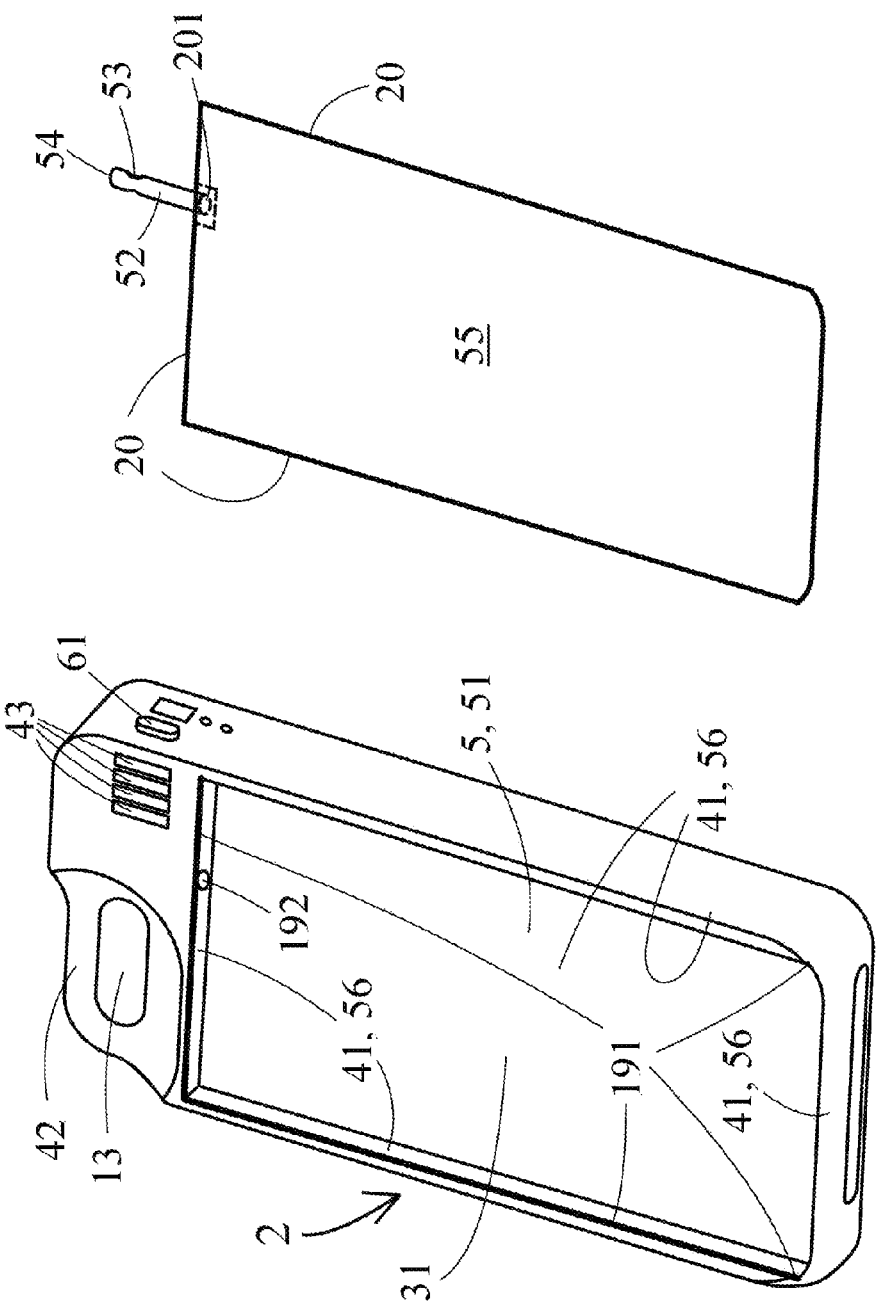

COMBINATION MOBILE PHONE PROTECTIVE CASE AND PORTABLE SAFE SYSTEM, APPARATUS AND METHOD

BACKGROUND OF THE INVENTION

Over the last several years the use of mobile phones has become ubiquitous. Mobile phones, especially the so-called smartphones that enable not only voice but also data communications including emailing and texting and typically have touch-screens responsive to a user's touch, are carried by people virtually everywhere they go. Indeed, continuously checking emails and texts and looking for information on the Internet is so pervasive for many people, that some have likened it to an obsession or an addiction.

Given the incessant attention that people give to their mobile devices, these devices are unlikely to be forgotten by their owners. People are more likely to leave their wallets or their credit cards somewhere, than they are to leave their mobile devices. And if they have inadvertently left a mobile device somewhere, it is often only a matter of minutes before a person will habitually reach for their device and realize it is not with them, and immediately return to their last location to retrieve their mobile device.

As the use of mobile smartphones has increased, and given the cost to replace these devices if they are damaged, the use of mobile phone protective cases has also become widespread. As illustrated in prior art FIGS. 1 and 3, these cases are manufactured to a size and dimension whereby one may simply press a mobile phone (not shown) into the protective case in a well-known manner, so that the phone is thereafter protected from the outside elements along its back and along all four sides. Further, a user will also often purchase a transparent cover (not shown) for the front face of the device which cover does not bar signals from the user's fingers from passing through the cover, so the user can still operate the mobile device touch screen even with such a cover in place. These mobile phone protective cases, like the mobile phones to which they are attached, are also unlikely to be forgotten, precisely because they are attached to and travel with the mobile phone.

Although the psychological attachment that people have to their mobile phones is often viewed in a negative way, there is one very positive benefit to this: any personal items which might be attached to the phone—such as the protective case—have a very low probability of being lost or forgotten precisely because the user is so attentive to the phone and thereby as a corollary implication, to whatever else may be attached to the phone. This makes the mobile phone protective case in particular, an ideal vehicle for carrying with the phone, small personal items such as credit cards, hotel room key cards, paper money, coins, keys, pills, jewelry, and the like. These items often are valuable and/or can be replaced only with a great deal of time expenditure, and so it is desirable that these be kept safe and not be lost or stolen.

The prior art does reveal a number of mobile phone protective cases which are designed to enable users to carry small personal items. For example, U.S. Pat. No. 8,047,364 discloses a protective covering for a personal electronic device that contains "an externally accessible pocket . . . in the manner of a wallet" (abstract). This pocket, however, is not enclosed, nor is it locked, so whatever may be contained in this pocket can easily fall out or be stolen in the event a user is momentarily inattentive to, or clumsy with, their device. Similar devices configured with slot or pockets and having similar limitations are disclosed in U.S. Pat. No. 8,381,904; U.S. Pat. No. 8,718,729; U.S. Pat. No. 8,757,376; U.S. Pat. No. 8,923,938; U.S. Pat. No. 8,989,826; US 2011/0294556; US 2013/0095898; US 2014/0066142; US 2014/0148228; US 2015/0156297; US 2015/0365122 and US 2016/0028430. US 2014/0228082; US 2015/0018056 and US 2016/0028429 are also of the same genre, but utilize a hinged or billfold configuration that is likewise not secure.

The prior art also reveals a number of mobile phone protective cases that facilitate carrying with the phone, very specific, specialized personal items. This prior art includes U.S. Pat. No. 8,483,786; U.S. Pat. No. 8,971,975 and US 2011/0136555 (bottle opener); U.S. Pat. No. 8,879,773; U.S. Pat. No. 8,827,074; US 2006/0121962; US 2007/0293288 and US 2015/0319274 (earbuds and wires); US 2013/0344925 (keys); US 2014/0162735 (touch pen); US 2014/0315603 (measuring device); US 2014/0370945 (personal defense shock device); US 2015/0141093 (lighter); US 2015/0244407 (pills/medications). Aside from being configured in a limiting way to carry these specialized personalized items, these cases also do not provide suitable security for whatever they are carrying.

All of the foregoing reveals a need to improve the prior art so that mobile integrated phone cases used to carry personal items are configured in such a way that the personal items being stored are securely attached and locked to or within the integrated phone case so as to prevent their falling out or being easily stolen.

Specifically, it would be desirable to have a mobile phone protective case designed with a latching "frame and drawer" configuration that provides enhanced security against loss or theft of reasonably-valuable personal items being carried by that protective case.

It would further be desirable for the mobile phone protective case to provide a security lock so that even if some other person who does not own the phone were to come into possession of the phone (such as by theft or by finding a lost phone), it would be impossible for that other person to remove any personal items being stored in the integrated phone case without either providing the correct credentials to the lock or breaking the lock. In this way, the mobile phone protective case would become, in effect, a small, portable, personal safe as well.

SUMMARY OF THE INVENTION

Disclosed herein is an integrated mobile phone protective case and carrier drawer system, and related apparatus and method, for securely containing small personal items, comprising: a regular mobile phone protective case portion of the integrated mobile phone protective case configured to receive and hold a mobile phone within a phone housing space thereof, and configured once a mobile phone has been placed therein to surround and protect the mobile phone using a back surface, a top surface, a bottom surface, and two side surfaces of the regular case portion, but configured to leave a front surface of the mobile phone accessible to a user's vision and touch; a drawer space integrally contained inside a rear part of the integrated mobile phone protective case, the drawer space comprising a substantially rectangular cuboid enclosing five out of six surfaces of the substantially rectangular cuboid with the remaining sixth surface being open; a personal item carriage drawer comprising a substantially rectangular cuboid enclosing five out of six surfaces of the substantially rectangular cuboid with the remaining sixth surface being open; a drawer cover separate from the integrated mobile phone protective case, configured to mate onto the rear part of the integrated mobile phone protective case, wherein after the drawer cover has been mated onto the integrated mobile phone protective case, the system becomes configured such that all six surfaces of the personal item carriage drawer become enclosed such that any personal items contained within the personal item carriage drawer become fully enclosed on all sides within the integrated mobile phone protective case; a latching extension integrally affixed with the drawer cover; a latch integrally affixed with the integrated mobile phone protective case and configured to latch together with the latching extension; and a release actuator for releasing the latching extension from the latch; wherein: after the drawer cover has been mated onto the integrated mobile phone protective case, the latching extension simultaneously becomes latched together with the latch thereby preventing the drawer cover from being removed from the integrated mobile phone protective case until the release actuator is actuated to release the latching extension from the latch; when the latching extension is latched together with the latch, any personal items contained within the personal item carriage drawer within the integrated mobile phone protective case cannot be removed from the drawer; and when the release actuator is actuated, the latching extension is released from the latch in response thereto, so that the drawer cover can be removed from the integrated mobile phone protective case and any personal items contained within the personal item carriage drawer can then be removed from the drawer.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

FIG. 19 is right-rear-bottom perspective view of an integrated phone case in accordance with an alternative preferred embodiment of the invention, in which the back of the integrated phone case is itself the carriage drawer into which personal objects are placed.

FIG. 20 is a right-rear-bottom perspective view of a drawer cover used in connection with the embodiment of FIG. 19.

DETAILED DESCRIPTION

Figure 1:
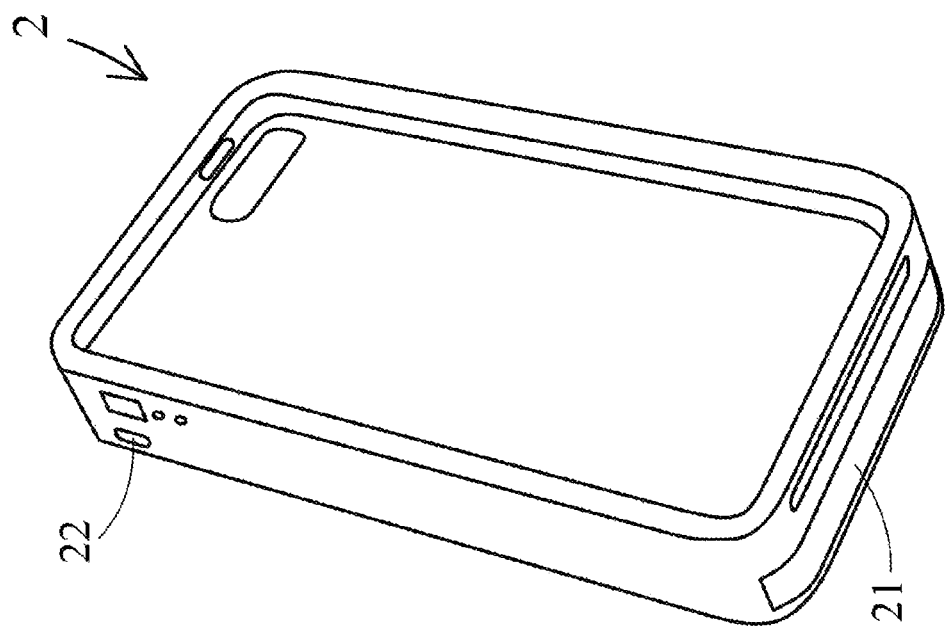
FIG. 1 is a front-left-bottom perspective view of a representative prior art phone protective case.

FIG. 1 illustrates a representative prior art (regular) phone protective case 1 from a front-left-bottom perspective view. While there are many different types of mobile phone in the prior art and new phone models are released on a regular basis, all integrated phone cases have the same basic features, and so the integrated phone case used for non-limiting illustration in this patent disclosure will be an integrated phone case for an iPhone 5. As is well known, to protect a phone (not shown) with the regular phone case 1, the user presses the phone with the touch screen facing forward into the regular case 1, past a flexible phone retention lip 11, and into the phone housing space 12, with the lip 11 thereafter retaining the phone within the housing space. As is well known, such regular cases 1 are configured to receive and hold a mobile phone in the phone housing space 12 thereof, and specifically, are configured once a mobile phone has been placed therein to surround and protected the mobile phone using a back surface 112, a top surface 18, a bottom surface 19, and two side surfaces 111 of the regular case 1, but configured to leave a front surface of the mobile phone accessible to a user's vision and touch. Although these regular mobile phone protective cases 1 are so-configured to leave the front surface of the mobile phone accessible to the user's vision and touch, it is also common practice to protect this final front surface of the phone using an optional transparent shield comprising a material that adheres over the face of the phone and also enables the user's touch to pass through to operate the touch screen behind this shield. When stated in this disclosure and the claims that the regular case 1 leaves the front surface of the mobile phone accessible to the user's vision and touch, it is to be understood that the optional use of such a shield over the front surface of the phone still does leave the front surface of the mobile phone accessible to the user's vision and touch in this way, and so is included within the scope of such statements.

The regular case 1 in this illustration contains a camera lens aperture 13 which enables the camera lens of the phone to be visually unobstructed by the regular case 1, and at least one port/speaker aperture 14 through which the charging/data port and the speakers and the earpiece interface also remain externally accessible without obstruction. Also illustrated is an on/off pass-through button 15 which, when depressed by the user, passes this depression through to the button on the phone which powers the phone on and off, as well as volume control pass-through buttons 16 which, when depressed by the user, pass this depression through to the buttons on the phone which raise and lower the volume of the phone speakers and possibly other modulated aspects of the phone such as screen brightness. Finally, FIG. 1 illustrates a tone/vibration mode aperture 17 which enables the user to access the switch on the phone that causes the phone to switch between audible tones (such as but not limited to the phone's ring tone) and silent vibration mode.

Figure 3:
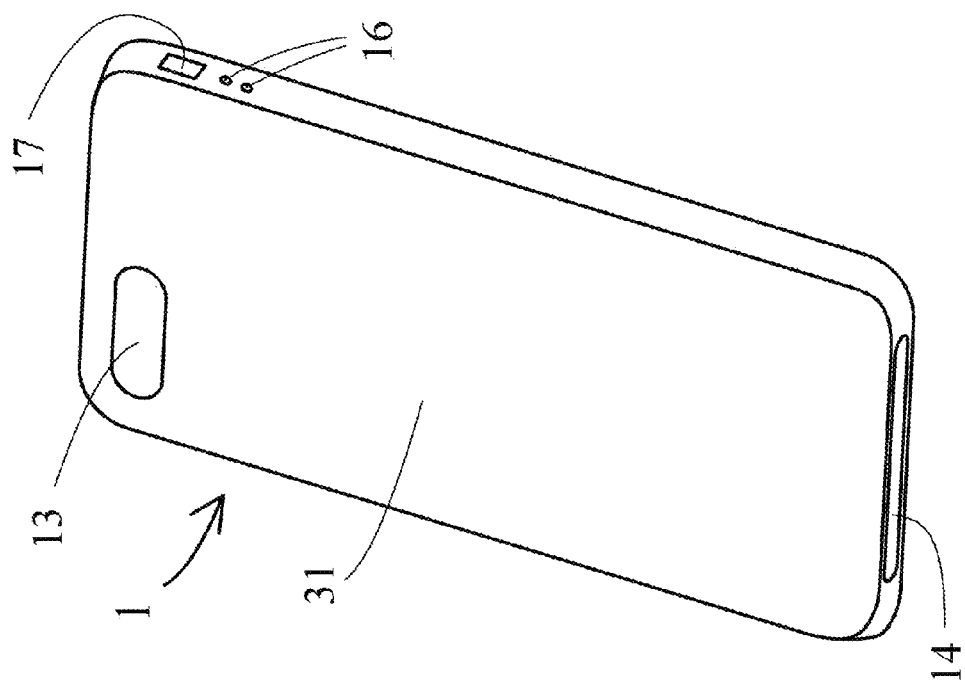
FIG. 3 is a right-rear-bottom perspective view of the representative prior art integrated phone case of FIG. 1.

FIG. 3 illustrates the exact same regular prior art phone protective case 1 as FIG. 1, but from a right-rear-bottom perspective view behind the regular case 1. The elements that are visible from this view are the camera lens aperture 13, the port/speaker aperture 14, the volume control pass-through buttons 16 and the tone/vibration mode aperture 17, as well as the rear surface 31 of the regular phone protective case 1.

Again, these prior art illustrations are exemplary only and not limiting, and use a case for the iPhone 5 as the basis for illustration. It is well-understood that different models of mobile phone can and do alter the physical layout of the various phone functions referenced above, and that protective cases for these phones will then need to be laid out accordingly to permit proper unobstructed access by and to all of the phone's functions. Now we turn to the disclosure of the invention, which builds upon this basic, regular phone protective case design.

Figure 2:
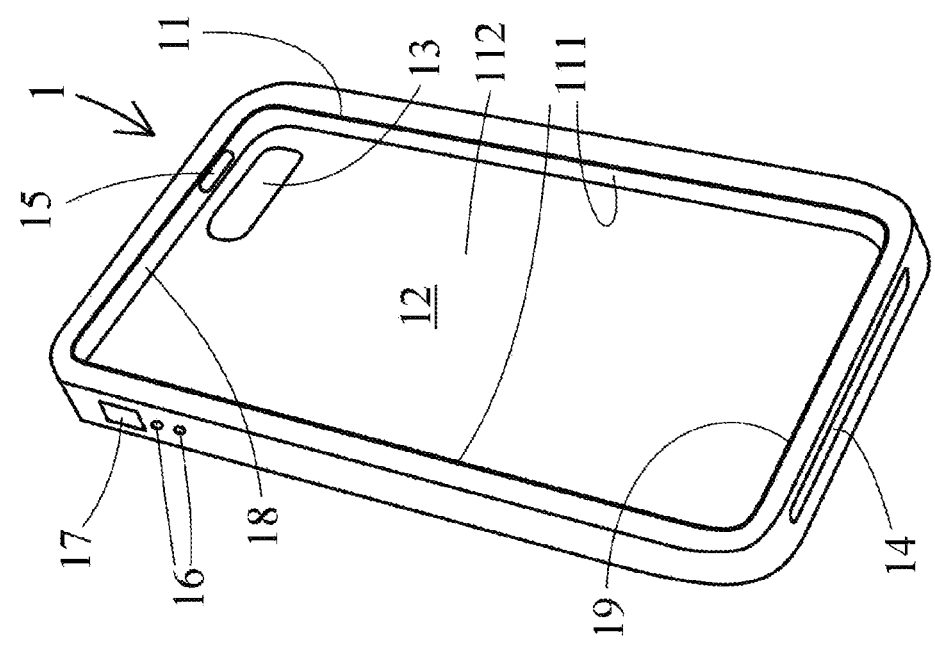
FIG. 2 is front-left-bottom perspective view of an integrated phone case in accordance with a preferred embodiment of the invention.
Figure 4:
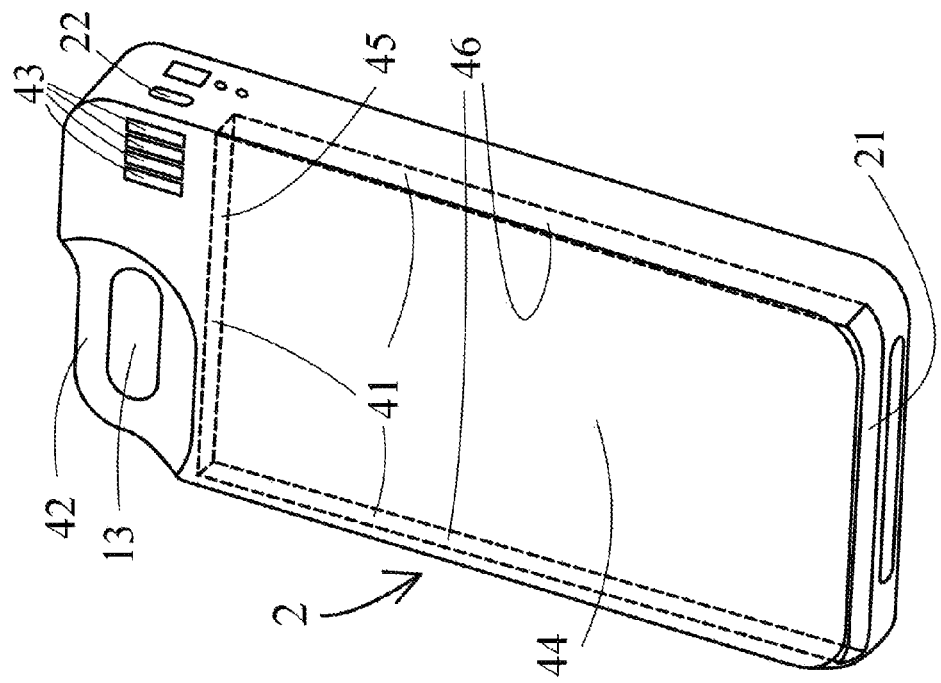
FIG. 4 is right-rear-bottom perspective view of an integrated phone case in accordance with the preferred embodiment of the invention of FIG. 2. This includes four wheel lock apertures employed in those invention embodiments containing an optional physical combination lock.

FIG. 2 shows an integrated phone protective case apparatus 2 for securely carrying small personal items in accordance with a preferred embodiment of the invention, from a front-left-bottom perspective view, while FIG. 4 shows this same integrated case 2 from a right-rear-bottom perspective view. Referring to FIG. 2, the front part of integrated case 2 is substantially identical to regular case 1, with the novel and inventive elements used to securely carry small personal items situated toward the rear part of integrated case 2. Two elements of the invention shown in FIG. 2 are a carriage drawer opening 21 and a drawer latch release button aperture 22.

Figure 5:
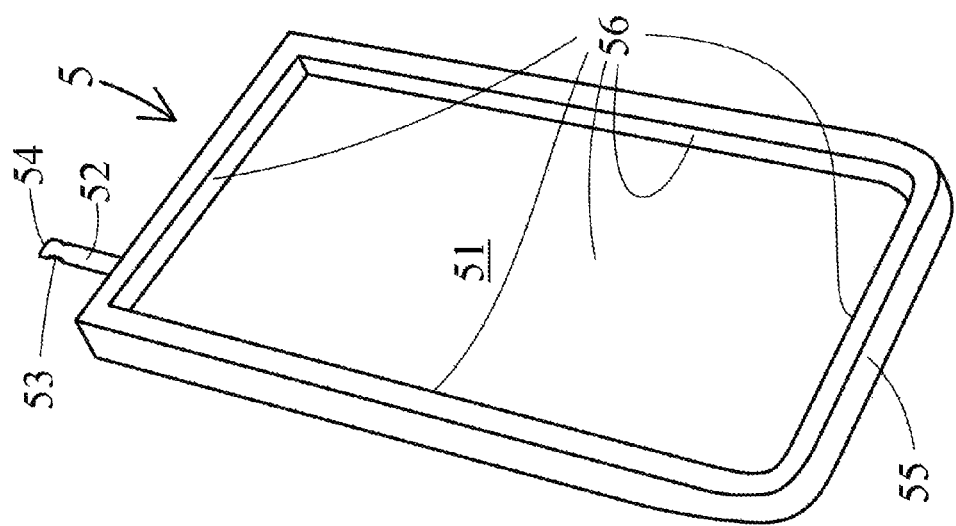
FIG. 5 is a front-left-bottom perspective view of a personal item carriage drawer with latching extension, in accordance with a preferred embodiment of the invention.

Rear view FIG. 4 illustrates these same two elements 21 and 22 as front view FIG. 2, but also shows with hidden lines a carriage drawer space 41 situated on the rear part of the integrated case 2. This carriage drawer space 41 is a space into which a personal item carriage drawer 5 shown in FIG. 5 is inserted for the purpose of carrying small personal items in a secure manner inside the integrated phone case 2. This carriage drawer space 41 forms a substantially rectangular cuboid, and is bounded by the rear surface 44 of the integrated phone case 2, the rear surface 31 of the ordinary phone protective case 1, an upper surface 45 of the drawer space 41, two side surfaces 46 of said drawer space 41, and the carriage drawer opening 21.

Additionally, to ensure that the extra depth which the carriage drawer space 41 adds to the rear part of the integrated case 2 does not impair taking photographs and videos with the phone camera, a camera lens recess 42 is also provided. This recess 42 simply carves away any extra case depth in the vicinity of the camera lens aperture 13 so that the extra depth does not block the camera lens. The rear surface 44 of the integrated phone case 2 is a solid surface, which is why the drawer space 41 is illustrated with lines hidden behind the rear surface 44. It is also to be noted that the carriage drawer space 41 forms a substantially rectangular cuboid, with five of its six surfaces enclosed and the remaining sixth surface—here, the carriage drawer opening 21—being open. Finally, for those invention embodiments which employ an optional physical combination lock, FIG. 4 also illustrates a series of four wheel lock apertures 43 through which the wheel lock disks 7 of FIG. 7 protrude.

FIG. 5 illustrates a personal item carriage drawer 5 from a front-left-bottom perspective view. This drawer 5, which in this embodiment is separate from the carriage drawer space 41 of FIG. 4, has a recessed drawer space 51 into which the user places small items that are to be carried securely within the integrated phone case 2, such as but not limited to credit, debit and other bank cards, room key cards, keys, currency bills, currency coins, pills, small jewelry, etc., all of which are valuable and/or can be cumbersome to have to replace if lost or stolen. Referring to FIG. 5, it will be seen that the drawer space 51 comprises a substantially rectangular cuboidal personal item carriage drawer 5 enclosing five 56 out of six surfaces of the substantially rectangular cuboid with the remaining sixth surface being open. When we refer here and elsewhere in this disclosure and in the claims to a "substantially" rectangular cuboid, we are noting that FIG. 5 illustrates a curvature at the bottom left and bottom right corners of the drawer 5, and so regard as "substantially" a rectangular cuboid, any rectangular cuboid with curvature at one or more of its corners, as well as with any other minor inconsequential shape variations that might be introduced.

Also illustrated in FIG. 5 is a latching extension 52 with a latch engagement nook/aperture 53 and an extension topside 54 that is used for securely latching (and optionally locking) the carriage drawer 5 inside the carriage drawer space 41 inside the rear part of phone protective case 2. At the bottom of carriage drawer 5 is a drawer cover 55 comprising the bottom one of the five surfaces 56, because when the drawer 5 is fully inserted and latched into the integrated phone case 2, it is this cover 55 which prevents items stored inside the drawer 5 from being removed. This will be further seen and detailed in FIG. 10. As a result of this configuration, it is seen that the latching extension 52 is integrally affixed with, and relative to, the entire drawer 5 including the drawer cover 55.

Figure 6:
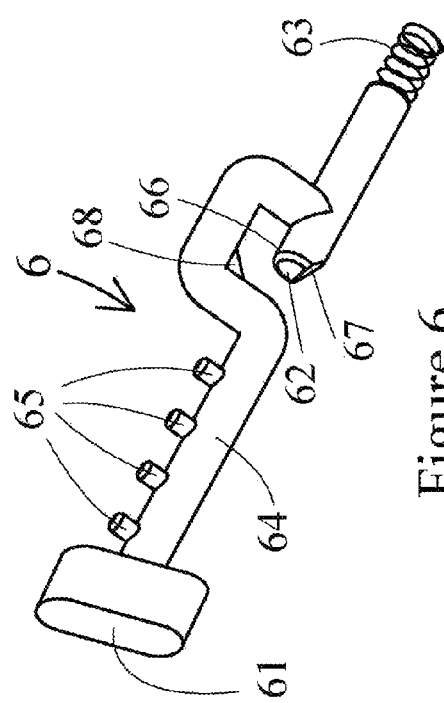
FIG. 6 is a perspective view of a locking pin in accordance with a preferred physical locking embodiment of the invention.

FIG. 6 illustrates a locking pin 6 which is used to lock the personal item carriage drawer 5 into the carriage drawer space 41 of integrated phone case 2. This includes a latch release button 61, a drawer retention head 62, a spring tension member 63, a locking pin spindle 64, and a set of locking teeth 65 which engage with the wheel lock disks 7 of FIG. 7 and—when a disk is rotated to the correct number of the combination needed to unlock that disk—which teeth 65 pass through unlocking notches 72 of the wheel lock disks 7. It should also be noted how the topside region 66 of locking pin 6 just above retention head 62 runs flush with the rest of the top surface of the pin 6, but how the underside region 67 of locking pin 6 just below retention head 62 is angled. As will be further detailed, this is part of how the pin 6 engages with latching extension 52 to hold or release the carriage drawer 5 within and from the integrated phone case 2. Also illustrated is a latch aid/cover release member 68 which as will momentarily been seen, serves the dual purpose of engaging the latch when the drawer 5 is placed into the integrated phone case 2, and pressing the drawer 5 out of the integrated phone case 2 when the release button 61 (and more generally a release actuator) is actuated.

Figure 7:
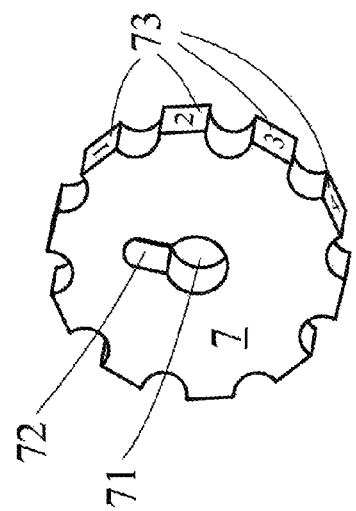
FIG. 7 is a perspective view of a rotary wheel lock in accordance with a preferred locking embodiment of the invention.

FIG. 7 illustrates a rotary wheel lock 7 in accordance with a preferred though optional locking embodiment of the invention, from a perspective view. This includes a spindle aperture 71 and an unlocking notch 72 through which the locking teeth 65 pass when a given wheel lock is aligned to the correct combination orientation. Also illustrated are some of the externally-visible digits 73 on these wheel locks 7, which wheel locks are used in a combination lock invention embodiment to secure the drawer 5 inside the integrated phone case 2. Having shown the primary elements of the invention in FIGS. 1 through 7, we now turn to a discussion of how these elements operate together to effectuate the invention.

Figure 8:
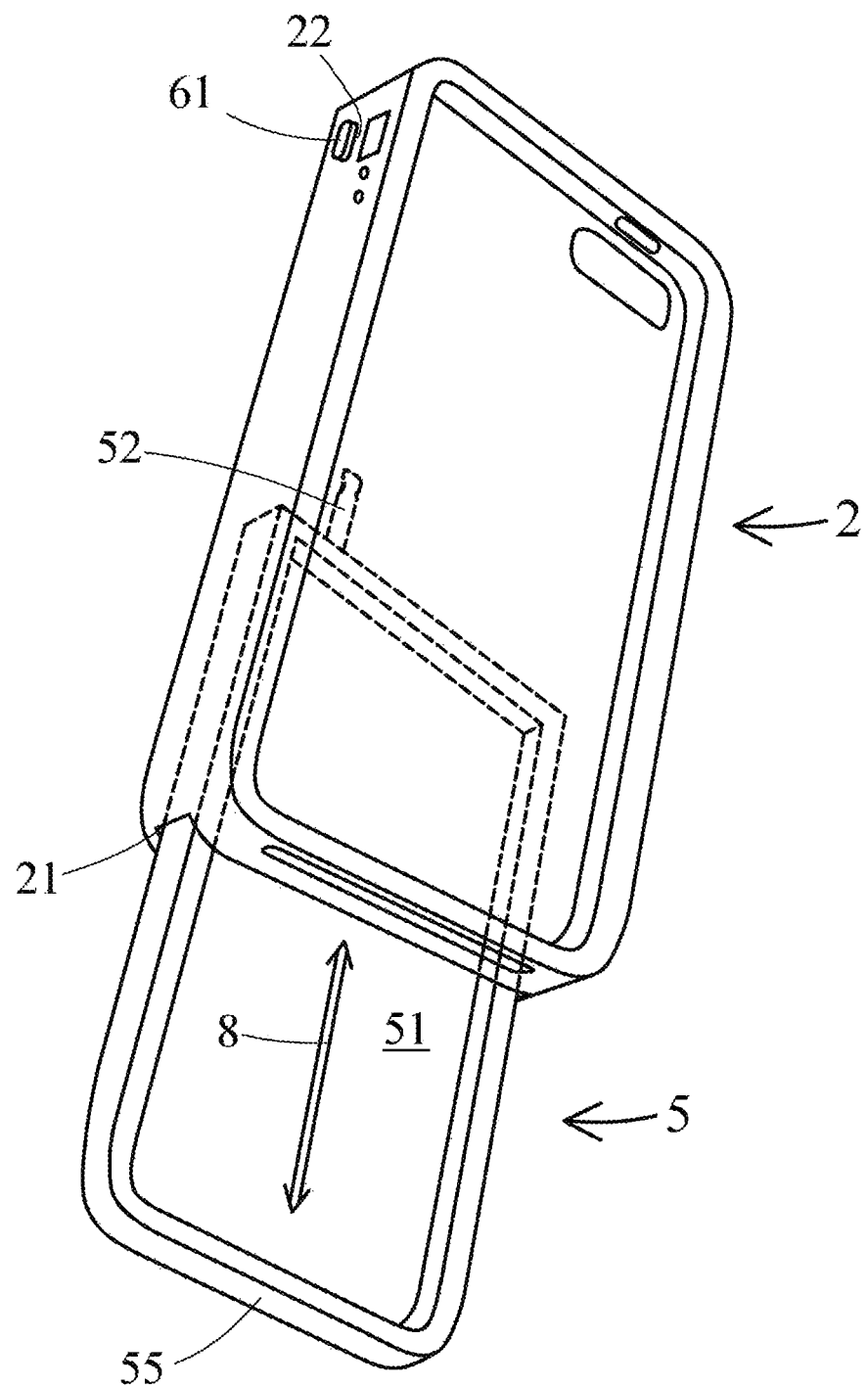
FIG. 8 is a front-left-bottom perspective view illustrating how the mutual configurations of the integrated phone cases in FIGS. 2 and 4 and the personal item carriage drawer in FIG. 5 enable the personal item carriage drawer to be slid in and out of the integrated phone case.

FIG. 8 illustrates how the mutual configurations of the integrated phone case 2 and the personal item carriage drawer 5 enable the personal item carriage drawer 5 to be slid in and out of the integrated phone case 2, specifically, through the carriage drawer opening 21 into and out of the carriage drawer space 41 of FIG. 4. As will be seen, the user simply takes the carriage drawer 5, and with the latching extension 52 entering first, inserts the carriage drawer 5 through the carriage drawer opening 21, and then slides the carriage drawer 5 into the drawer space 41 of FIG. 4. To remove the carriage drawer 5 the user simply slides the carriage drawer 5 in the opposite direction. This is all illustrated by the arrows 8. If the user has placed small personal items inside the recessed drawer space 51, then those items will naturally be stored inside the integrated phone case 2 when the drawer is inserted all the way into the integrated phone case 2 and then latched or locked in place, with the drawer cover 55 moving into a position to block those personal items from falling out or being removed without sliding 8 the drawer 5 back out. We shall examine all of this more closely in FIGS. 9 through 11. Also shown is the latch release button 61 protruding through drawer latch release button aperture 22 for purposes to now be described more fully.

Note that although the drawer 5 as illustrated in FIG. 8 (and momentarily FIG. 10) is shown to be forward-facing in relation to the front of the phone case 2, it is understood within the scope of this disclosure and its associated claims that this system can readily be designed to have the drawer 5 be rear-facing as an alternative embodiment.

Figure 9:
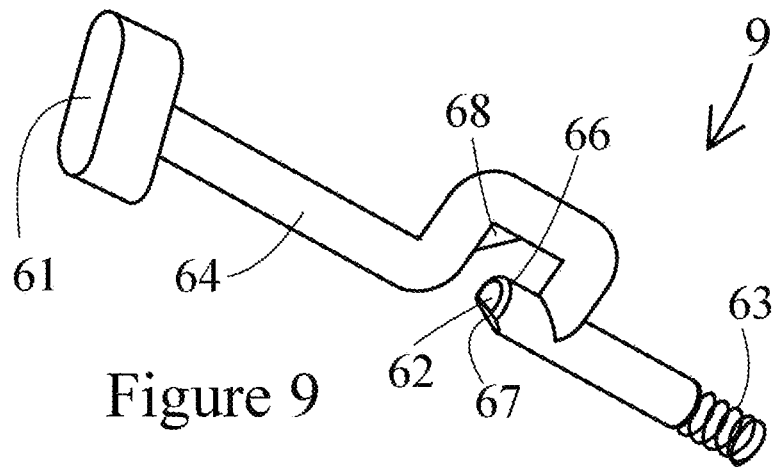
FIG. 9 is a perspective view of a latch in accordance with an alternative preferred embodiment of the invention.

FIG. 9 is a perspective view of a latch 9 in accordance with an alternative preferred embodiment of the invention. It will be seen that this latch 9 is identical in all respects to the locking pin 6 of FIG. 6 except that latch 9 omits the set of locking teeth 65. Conversely, the locking pin 6 of FIG. 6 is the same as the latch 9 of FIG. 9 but with the addition of the locking teeth 65. This is because the latch 9 is used for those embodiments of the invention for which the carriage drawer 5 is latched but not locked into the integrated phone case 2, or in which the carriage drawer 5 is locked into the case 2 by some locking means other than a physical combination lock. Conversely, the locking pin 6 is used for embodiments where the carriage drawer 5 is latched into the integrated phone case 2, and also locked using a physical combination lock. To elucidate the overall operation of the invention, it is easiest to start with the most-simplified embodiment of the invention which uses the latch 9, and in which the drawer 2 is latched but not locked.

Figure 10:
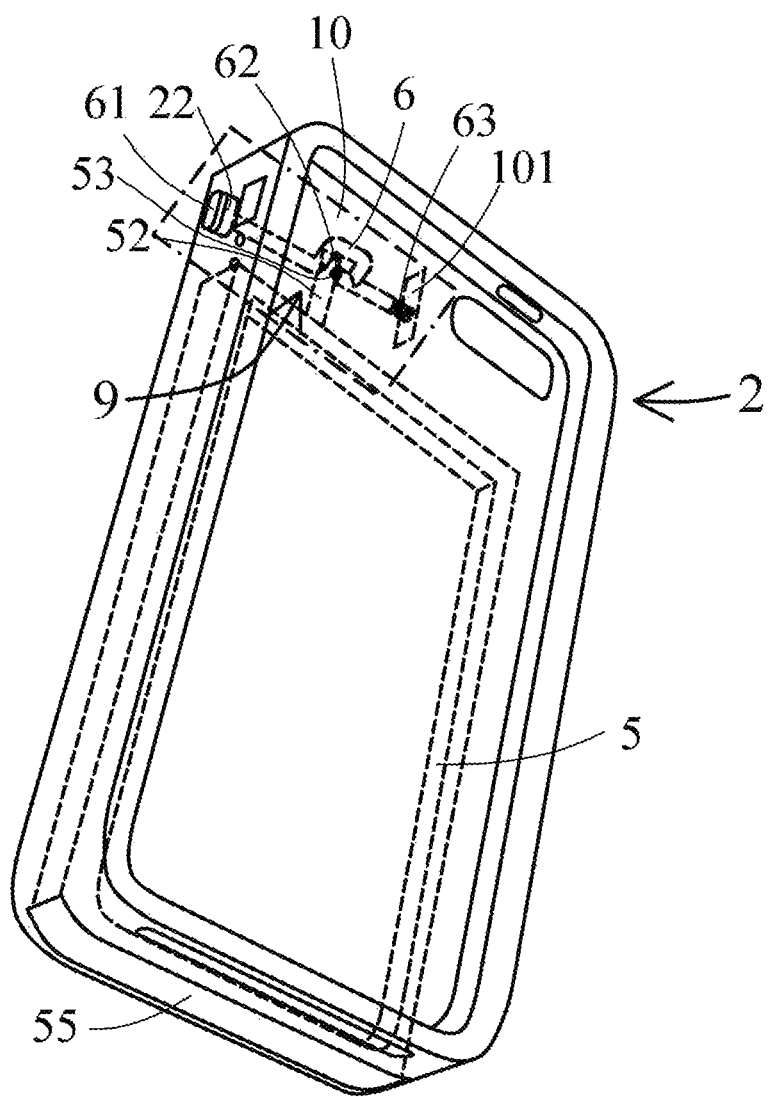
FIG. 10 is a front-left-bottom perspective view illustrating the personal item carriage drawer of FIG. 5 when it is fully seated within and latched together with the integrated phone case of FIGS. 2 and 4.

FIG. 10 is a perspective view illustrating the personal item carriage drawer 5 when it is fully seated within and latched together with the integrated phone case 2 using the latch 9 without a lock. Note that with the drawer 5 fully inserted into the integrated phone case 2, the drawer cover 55, which in this embodiment happens to concede with the bottom face of the drawer, serves to prevent any personal objects inside the integrated phone case 2 from falling out or being removed. That is, if the drawer did not have the cover 55, then whatever is inside the phone case 2 could fall out or be removed when the user does not intend for this to occur.

As a result, it will be seen how the after the personal item carriage drawer 5 including its drawer cover 55 has been slid onto said mobile phone protective case 2, all six surfaces of the substantially rectangular cuboidal personal item carriage drawer 5 become enclosed such that any personal items contained within the personal item carriage drawer 5 become fully enclosed on all sides within the mobile phone protective case 2. It will also be seen within the region designated 10 enclosed by a rectangular border, how spring 63 abuts a spring stop 101 so as to press drawer retention head 62 into the latch engagement nook/aperture 53, and how the latching extension 52 may be released by the user depressing latch release button 61 to move the latch 9 in the opposite direction to that motivated by the spring 63. Most importantly, we see how the latching extension 52 and thus the entire drawer 5 is held in place by the latch 9, and how the latch 9 is integrally affixed with the mobile phone protective case 2 and configured to mate and latch together with the latching extension 52. This will be now be further detailed by the magnified view of FIGS. 11 and 12.

Figure 11:
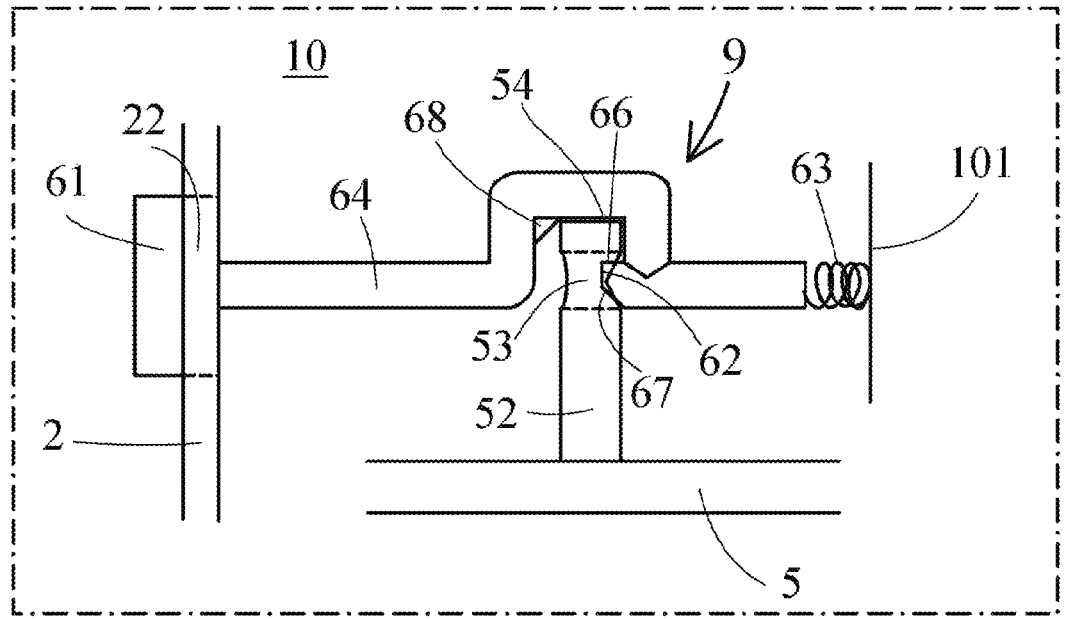
FIG. 11 is a magnified front plan view of a region designated in FIG. 10, showing the latch of FIG. 9 when it is keeping the personal item carriage drawer of FIG. 5 latched inside the integrated phone case of FIGS. 2 and 4.

FIG. 11 magnifies the region 10 in FIG. 10, and illustrates in a front plan view, the latch 9 when it is holding the latching extension 52 in place and therefore keeping the personal item carriage drawer 5 (of which a section is illustrated to provide a point of relative reference) connected thereto latched inside of integrated phone case 2 (of which a section is illustrated to provide another point of relative reference). Specifically, because of an outwardly-directed force between spring 63 and spring stop 101 the latter of which is fixed relative to case 2 but the former of which is not, FIG. 11 illustrates the natural horizontal position of latch 9 relative to integrated phone case 2, when no force 120 (see FIG. 12) is applied by the user to latch release button 61. This includes a protrusion of latch release button 61 through drawer latch release button aperture 22 beyond the left exterior of the illustrated section of integrated phone case 2. With the latch 9 in the illustrated horizontal position relative to integrated phone case 2, retention head 62 is seen to be inserted partly or fully into the latch engagement nook/aperture 53.

Now, because latch 9 comprises a horizontal topside 66, any attempt to pull down on carriage drawer 5 to remove it from the integrated phone case 2 will be resisted by the engagement of horizontal topside 66 with the top surface of latch engagement nook/aperture 53. On the other hand, it will be appreciated that when the user first inserts the carriage drawer 5 through the carriage drawer opening 21 into the integrated phone case 2 as in FIG. 8 and then presses the drawer 5 all the way in, the extension topside 54 of latching extension 52 will press against the angled underside region 67 of latch 9. This will cause latch 9 to be moved toward the right, compressing the spring 63 so that the upward movement of drawer 5 and latching extension 52 can continue. Then, once the latching extension 52 has moved far enough upward so that top surface of the latch engagement nook/aperture 53 has cleared the horizontal topside 66 of locking pin 6, the compressed spring 63 will press the latch 9 back to the left, causing retention head 62 to enter the latch engagement nook/aperture 53 so as to latch the drawer 5 into the integrated phone case 2, thus yielding the configuration of FIG. 11. It will be appreciated by anyone skilled in the art that the angling shown by angled underside region 67 can instead be included in the topside 54 of latching extension 52, or that underside region 67 and topside 54 can both be angled, all toward the same effect, and all within the scope of this disclosure and its associated claims.

Figure 12:
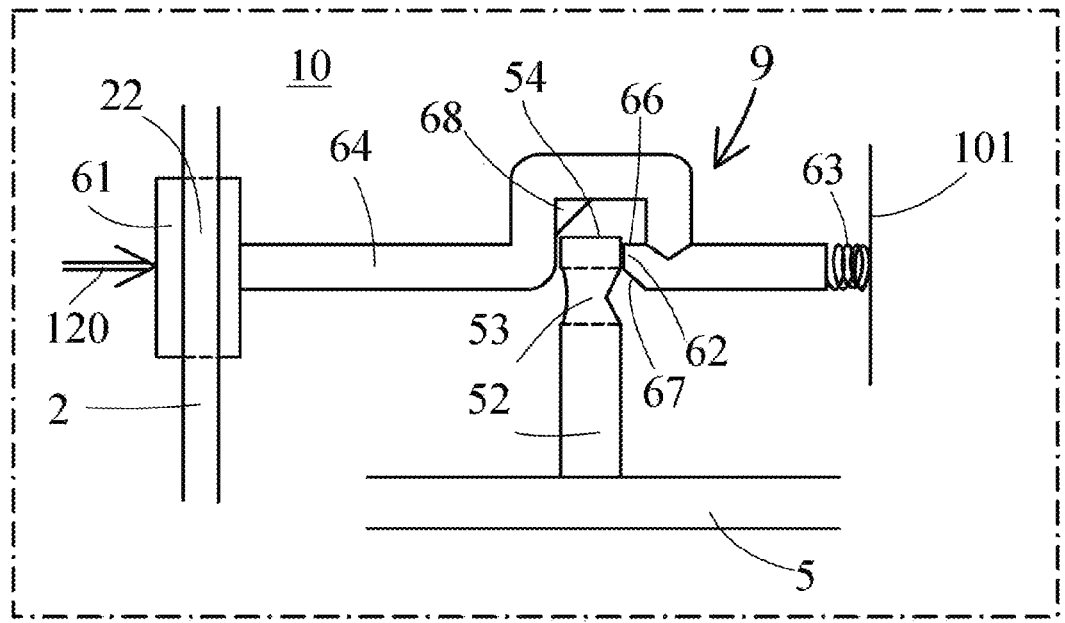
FIG. 12 is a magnified front plan view of the same region designated in FIG. 10 and magnified in FIG. 11, now showing the latch of FIG. 9 when a latch release button is depressed so as to disengage the personal item carriage drawer of FIG. 5 for removal from inside the integrated phone case of FIGS. 2 and 4.

FIG. 12 now illustrates the latch 9 when the latch release button 61 is pressed inward (toward the right) so as to disengage the latch 9 from the latching extension 52 and therefore enable the personal item carriage drawer 5 to be removed from the inside of integrated phone case 2. For this operation, starting with the configuration of FIG. 11, when the user wishes to release the carriage drawer 5 from the integrated phone case 2, the user exerts a force 120 upon the latch release button 61. When the applied force 120 from the user is greater than the leftward force exerted by the spring 63, this force from the user is transmitted through the locking pin spindle 64 and the entire latch 9 will be moved toward the right into the relative position shown in FIG. 12. Because of this rightward movement, the drawer retention head 62 will no longer be inside of the latch engagement nook/aperture 53, and specifically, the horizontal topside 66 of latch 9 will no longer be inside of latch engagement nook/aperture 53 to block the downward movement of latching extension 52. As a result, the latching extension 52 becomes unlatched, and it now becomes possible for the user to remove the carriage drawer 5 from the inside of the integrated phone case 2. This latch release button 61 is the first of several embodiments that will be disclosed of a release actuator for releasing the latching extension 52 from the latch 9.

It will be appreciated as a result of the foregoing that after the drawer 5 and its drawer cover 55 have been slid onto the mobile phone protective case 2, the latching extension 52 becomes latched together with the latch 9 thereby preventing the drawer 5 and drawer cover 55 from being removed from the mobile phone protective case 2 until the release actuator (of which release button 61 is one embodiment) is actuated to release the latching extension 52 from the latch 9. It will further be appreciated by referring to FIG. 10, that when the latching extension 52 is latched together with the latch 9, any personal items contained within the personal item carriage drawer 5 within the mobile phone protective case 2 cannot be removed from the drawer 5 and the integrated case 2.

At this point, it is possible to also appreciate the role of the optional latch aid/cover ejection member 68. Starting from FIG. 12 in which latching extension 52 is slightly descended and not yet latched with the latch 9, it should be apparent that as the user slides the carriage drawer 5 further upward, the extension topside 54 will come into contact and press against the latch aid/cover release member 68. Because of the illustrated angling of this latch aid/cover ejection member 68, the net effect of this will be to exert a leftward force upon the overall latch 9, in the same direction as the force exerted by the spring tension member 63. As such, the very act of pressing the drawer 5 completely into the integrated case 2 will additionally cause the latching extension 52 to latch together with the latch 9. And, depending upon the exact design of the latch aid/cover ejection member 68 in relation to the other system components, this latch aid/cover ejection member 68 can be designed to functionally either supplement or take the place of the spring tension member 63.

Additionally, it will be observed upon studying FIG. 10 that once the drawer 5 is fully enclosed within the integrated case 2, but after the latch is released, absent some drawer removal mechanism to help the user pull the drawer 5 out of case 2, the user may have to "dig" the drawer 5 out using fingernails or a coin or a pocketknife or other similar means, which is not particularly user-friendly. Now, it is possible to attach some sort of grip (such as a cloth attachment or a keyring or the like) on the cover 55 as it is illustrated in FIG. 10, to aid in the cover 55's removal. Such removal aids, although not illustrated, are regarded to be within the scope of this disclosure and its associated claims. However, if the optional latch aid/cover ejection member 68 is provided, then it will be seen from FIG. 11 that when a rightward force is applied to the release button 61, one of the simultaneous consequences of providing the illustrated angling of latch aid/cover ejection member 68 will be the exertion of a downward force on the extension topside 54. And this downward force will cause the drawer 5 and its cover 55 to slightly eject from the case 2, eliminating the need for other ways to "dig" out the drawer 5. As such, the latch aid/cover ejection member 68 can be used for the dual purposes of helping latch the drawer 5 into the case 2, and of ejecting the drawer 5 from the case 2, possibly eliminating the need for the spring tension member 63 depending on design specifics within the purview of those of ordinary skill in the mechanical arts. Certainly, the latch aid/cover ejection member 68 or equivalent eliminates the need for any supplementary grips or other removal aids to be provided, in order for the user to be able to easily extract the drawer 5 from the case 2 once the latch 9 is released.

FIGS. 13 through 16 illustrate an alternative embodiment of the invention which not only includes the latching of carriage drawer 5 to integrated phone case 2 via latching extension 52 and latch 9 (here, locking pin 6), but also includes a rotary physical combination lock which locks the latching mechanism so that the carriage drawer 5 cannot be removed from the integrated phone case 2 unless the proper lock combination is provided by the user. This introduces security against somebody else stealing from the user, whatever personal items may be stored inside the integrated phone case 2 and drawer 5 combination. In these drawings, the latch 9 illustrated in FIG. 9 becomes the locking pin 6 of FIG. 6, because it contains several locking teeth 65 which engage with the wheel lock disks 7 of FIG. 7 in the exemplary, non-limiting manner to now be described. As earlier noted, the latch 9 of FIG. 9 is identical in all respects to the locking pin 6 of FIG. 6 except that latch 9 omits the set of locking teeth 65; conversely, the locking pin 6 of FIG. 6 is the same as the latch 9 of FIG. 9 but with the addition of the locking teeth 65.

Figure 13:
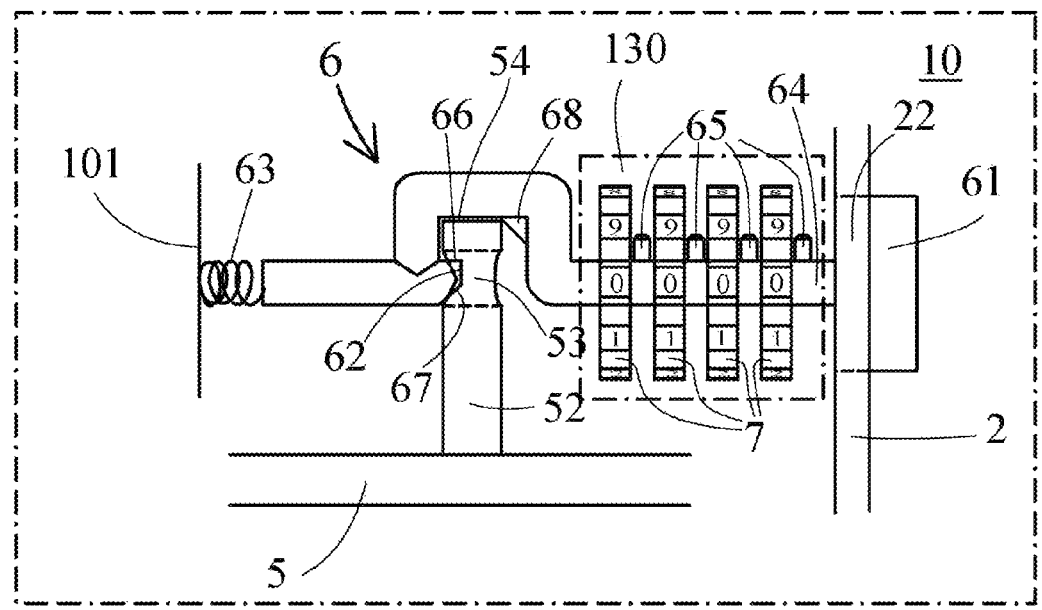
FIG. 13 is a magnified rear plan view of a region designated in FIG. 10, showing the locking pin of FIG. 6 when it is keeping the personal item carriage drawer of FIG. 5 latched and locked inside the integrated phone case of FIGS. 2 and 4, in an alternative invention embodiment which includes a lock in addition to a latch.

FIG. 13 is a magnified rear plan view of the region designated as 10 in FIG. 10, showing the locking pin 6 when it is keeping the personal item carriage drawer 5 of FIG. 5 latched and locked inside of the integrated phone case 2. Except for the following three differences, this is identical to FIG. 11: First, this is a rear view rather than a front view so it is a mirror image of FIG. 13. Second, the latch 9 of FIG. 9 now comprises several locking teeth 65 (four are used for illustration, without limitation) and so is the locking pin 6 of FIG. 6. Third, the integrated phone case 2 now comprises several wheel lock disks 7 (one for each locking tooth 65). The same is all true for FIG. 14 in relation to FIG. 12: these also are identical Figures except for the foregoing three differences.

The mechanism to release the carriage drawer 5 is exactly the same as it was as between FIGS. 11 and 12. This is to say, the user actuates the release actuator, which in this embodiment means that the user depresses the latch release button 61 so as to disengage the retention head 62 from the latch engagement nook/aperture 53 and thereby goes from the FIG. 13 configuration in which the latch 6 is engaged with the latching extension 52 to the FIG. 14 configuration in which these are disengaged from one another. However, in FIG. 13, a person is barred from depressing the latch release button 61 and disengaging the latch 6 from the latching extension 52 because the locking teeth 65 are blocked from leftward movement by the wheel lock disks 7 because one or more of these disks 7 is rotated to the wrong combination.

Figure 14:
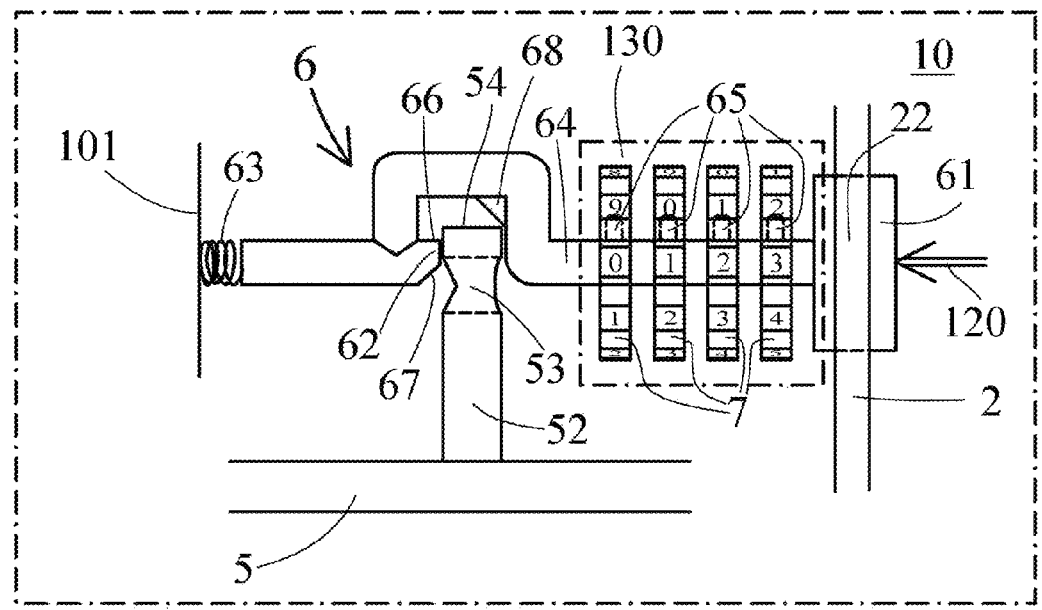
FIG. 14 is a magnified rear plan view of the same region designated in FIG. 10 and magnified in FIG. 13, now showing the locking pin of FIG. 6 when the lock is set to the correct combination for release (illustrated to be "0123") and a latch release button is depressed so as to disengage the personal item carriage drawer of FIG. 5 for removal from inside the integrated phone case of FIGS. 2 and 4.

Specifically, for illustrative purposes only, we shall regard "0123" to be the correct four-digit combination needed to unlock the combination lock. In FIG. 14, this "0123" is directly facing out, meaning that this correct combination has been provided, and because of this, applying the leftward force 120 to latch release button 61 allows the locking teeth 65 to pass into the unlocking notches 72 and not be blocked by the wheel lock disks 7, see FIG. 7 and momentarily, the magnified FIG. 15. This thereby effectuates the release of the drawer 5 from the integrated case 2. Conversely, in FIG. 13, "0000" is facing out, and since three of these four digits are incorrect, three of the four locking teeth 65 will be blocked from leftward movement by three of the four wheel lock disks 7, namely, the rightmost three teeth 65 and disks 7. When locked, the integrated phone case 2 in combination with the drawer 5 locked therein acts as a small, portable, personal safe for the items locked inside the drawer.

Figure 15:
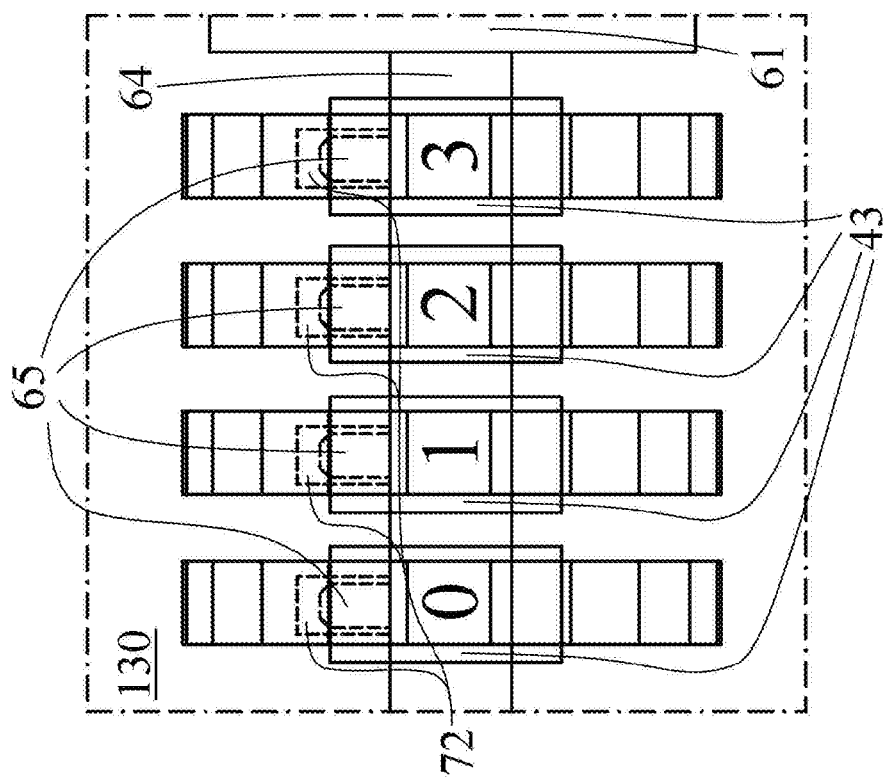
FIG. 15 is a magnified rear plan view of the region of FIG. 13 which contains the wheel lock disks of FIG. 7, as seen from the outside rear of the integrated phone case through the wheel lock apertures shown in FIG. 4, when the combination lock is set to lock the personal item carriage drawer into the integrated phone case.
Figure 16:
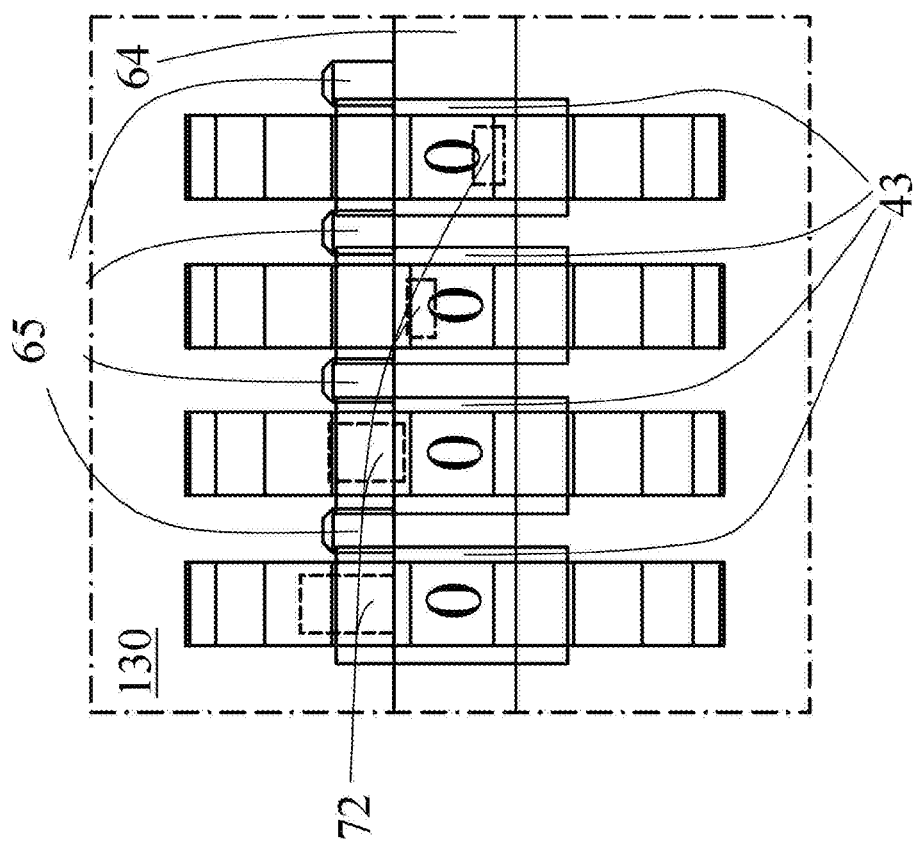
FIG. 16 is a magnified rear plan view of the region of FIG. 14 which contains the wheel lock disks of FIG. 7, as seen from the outside rear of the integrated phone case through the wheel lock apertures shown in FIG. 4, when the combination lock is set to release the personal item carriage drawer from the integrated phone case because the correct combination is provided.

FIGS. 15 and 16 magnify the region designated as 130 in FIGS. 13 and 14, in order to show the locking mechanism with greater visual clarity. In FIG. 16, because he correct combination "0123" has been set, all four of the unlocking notches 72 are vertically aligned to correspond with the vertical alignment of the four locking teeth 65, so that by depressing latch release button 61 the teeth 65 will penetrate the notches 72 and thus allow the latch to be released and the drawer 5 to thereby be removed. But, in FIG. 15, although the leftmost disk 7 is set to "0" which is the correct first digit of the combination, the other three disks 7 are set to the incorrect digits "000" and so their unlocking notches 72 are not aligned in such a way that the teeth 65 can pass through. In fact, in hidden lines, FIG. 15 illustrates this misalignment of the unlocking notches 72. This makes it impossible to move the spindle 64 to the left, and so the latch 6 remains latched and cannot disengage. This, in turn, via what is shown in FIG. 13 and from a wider view FIG. 10, causes the drawer 5 to be both latched and locked into the integrated phone case 2.

It will be appreciated by someone of ordinary skill in the art that the locking mechanism just described in FIGS. 13 through 16 is the same type of "tooth and notch" locking mechanism widely employed in the art for physical combination locks that utilize a succession of three or four or more wheels and counterpart teeth to lock and unlock a spindle such as 64 in relation to spindle apertures such as 71 via unlocking notches such as 72. Perhaps the most widely-known example of this mechanism are bicycle chain locks, see, for example, http://en/wikipedia.org/wiki/Combination_lock#Multiple-dial_locks.

Because this invention makes use of locking mechanisms that are well-known in the art but applies them in a novel and inventive configuration to the problem of storing personal items inside an integrated phone case and providing security by locking those items into the integrated phone case, it is to be understood that the "tooth and notch" locking mechanism used in this disclosure as an illustration is simply that: an illustrative, non-limiting example. After reviewing the foregoing disclosure, it will likely become apparent to persons of ordinary skill in the locking arts that there are other specific locking mechanisms that can be used to lock this drawer 5 into the integrated phone case 2 to achieve an equivalent result. Given this, it is to be understood that the use of insubstantially-different locking mechanisms, which perform substantially the same function, in substantially the same way, to yield substantially the same result of locking a storage compartment such as 5 into an integrated phone case such as 2, is regarded to be fully within the scope of this disclosure and its associated claims. Likewise, insubstantial differences such as varying the number of digits needed to unlock the drawer 5 from the integrated case 2 from the four digits modulo 10 illustrated here thus providing $10^4$=10,000 possible combinations, to a different number of digits and/or a different modulus are also regarded to be fully within the scope of this disclosure and its associated claims.

It is also well-known in the art that while some combination locks are produced with the combination fixed whereby the combination cannot be changed by the user, there are also many locks produced for which the combination may be set by the user. Typically, these locks will arrive after purchase with, e.g., if four digits, a "0000" combination. From this setting, the user will hold the mechanism in a certain prescribed position or press an auxiliary combination change button, and then rotate the disks 7 to the customized combination that the user wishes to employ. This action causes the externally-visible digits 73 to rotate relative to the internal unlocking notches 72 and then become fixed into the new orientation, in order to implement the customized combination, via approaches that are well-known to those of ordinary skill in the locking arts. While not expressly illustrated in the drawings, it is within the scope of this disclosure and its associated claims that the combination lock may be provided in combination with this overall invention such that the user can customize his or her combination by depressing the latch release button 61 to keep the spindle 64 in a specified position under specified circumstances while rotating the disks 7, or by depressing an auxiliary combination change button (not shown), or by any other means known to those of ordinary skill, in order to set a user-customized combination.

All of these latched and locked embodiments may also include the optional latch aid/cover ejection member 68, as illustrated in FIGS. 13 and 14, for the exact same purposes already described in connection with FIGS. 11 and 12.

Figure 18:
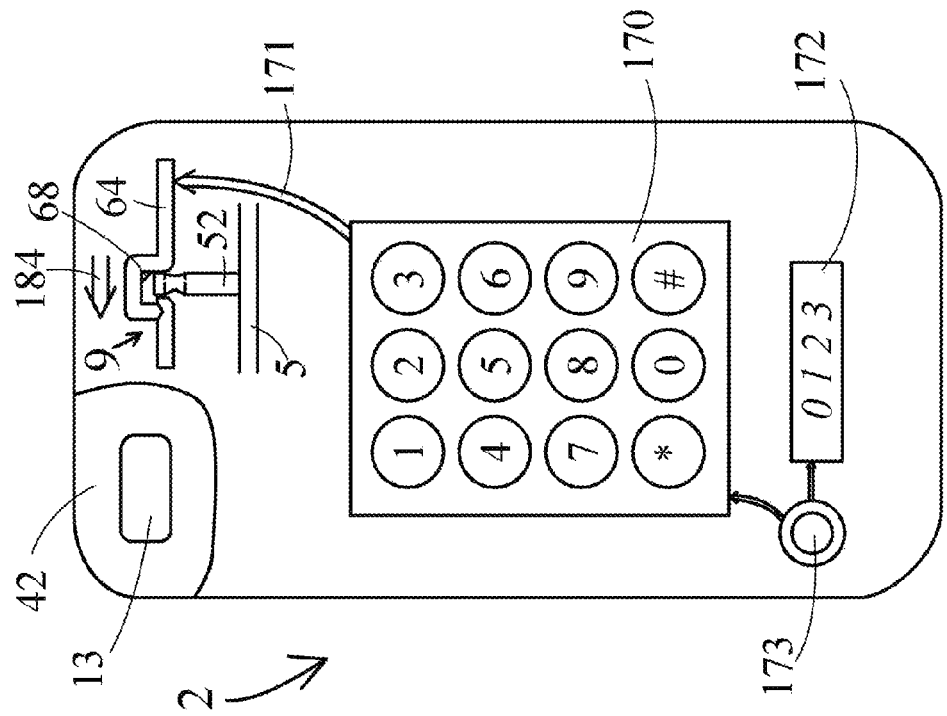
FIG. 18 is the same schematic rear plan view of the integrated phone case as was illustrated in FIG. 17, with the same sectional view of the latching mechanism, but after the correct combination has been entered via the electronic combination keypad, so that the drawer has been unlocked and can be removed from the phone.
Figure 17:
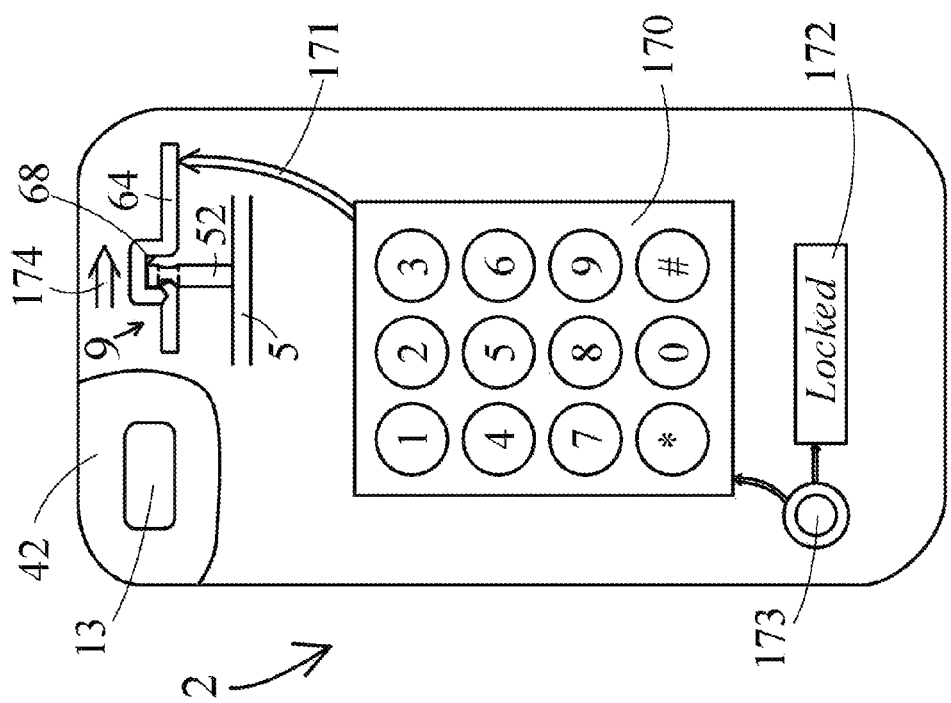
FIG. 17 is a schematic rear plan view of the integrated phone case of FIGS. 2 and 4, with a sectional view of the latching mechanism, in an alternative invention embodiment which latches and locks the personal item carriage drawer into the integrated phone case using an electronic combination keypad. In this figure, the drawer is locked into the phone.

FIGS. 17 and 18 illustrate another alternative preferred embodiment of the invention, in which the personal item carriage drawer 5 is locked into and unlocked from the integrated phone case 2 using an electronic combination keypad 170. Just as the operational principles of physical combination locks are well-known in the art for locking devices and methods, so too are the principles of electronic locks—specifically, electronic keypads which actuate a physical latch to either lock or unlock a safe in which personal items may be stored for safekeeping. Perhaps the most widely-known example of electronic keypads used to lock and unlock safes are hotel room safes inside which travelers often keep personal valuables such as wallets and pocketbooks, see, for example, http://buyhotelsafes.com/?gclid=CKuZ2OfL6MsCFUgkhgod-7QFbg and http://www.wilsonsafe.com/#!dormhoteland-patient-room-safes/clig.

Referring to FIGS. 17 and 18, as applied in the novel and nonobvious combination of the present invention, an electronic keypad 170 is attached to an accessible location on the integrated phone case 2, preferably on the rear of the integrated phone case 2 as illustrated. Although a ten-digit keypad 170 supplemented by a * key and a # key is illustrated, this is for example, not limitation. Powered by a power source 173 such as the schematically-illustrated small battery, the keypad 170 may be supplemented by an optional digital display 172, and may be powered by the same power source 173. This keypad 170 is used to physically actuate 171 the latch 9 in exactly the same manner that was illustrated in FIGS. 11 and 12, except that the latch release button 61 is replaced by the keypad 170 itself and the actuation 171 of the latch 9 is by the keypad 170.

In FIG. 17, the personal item carriage drawer 5 is shown to be locked into the integrated phone case 2 because the keypad 170 has actuated 171 the latch 9 toward the right so as to engage with the latching extension 52, as schematically illustrated by the sectional view of the latching mechanism with latch 9 moved toward the right, see arrow 174. In FIG. 18, the personal item carriage drawer 5 is shown to be unlocked from the integrated phone case 2 because the keypad 170 has actuated 171 the latch 9 toward the left so as to disengage from the latching extension 52, as schematically illustrated by the sectional view of the latching mechanism with latch 9 moved toward the left, see arrow 184.

At the user input interface, the process used to reach these two configurations is the same sort of process that would be employed to lock or unlock a hotel room safe. Starting with the unlocked configuration shown in FIG. 18, the user first fully inserts the carriage drawer 5 into the integrated phone case 2 as illustrated in FIGS. 8 and 10. Then, the user chooses a combination, say, for example, "0123," enters that combination, and, for example, then presses the * key. Depression of the * key indicates to the electronic computerized processing that the safe is to be locked, and that "0123" is to be recorded in a non-transient computerized memory as the combination required to later unlock the safe. So, the electronic system stores "0123" as the combination, physically actuates 171 the latch 9 to move to the right 174 and thereby engage the latching extension 52, and by the latch 9 so-engaging, locks the carriage drawer 5 into the integrated phone case 2. Now, the configuration of FIG. 17 is reached.

Later, when the user wishes to open the personal, portable integrated phone case safe, the user simply enters the correct combination, illustrated to be "0123," at the input keypad. The processor compares the entered combination with the correct combination stored in memory, determines that there is a match, and so actuates 171 the latch 9 to move to the left 184 and thereby disengage the latching extension 52. As a consequence, in these embodiments which employ an electronic keypad, it is the entry of a correct passcode via the electronic keypad 170 that serves as the release actuator for releasing the latching extension 52 from the latch 9. By disengaging the latch 9, the carriage drawer 5 becomes unlocked and so can be removed from the integrated phone case 2. This returns the configuration to that which is illustrated in FIG. 18. Of course, if the incorrect combination is entered, then the latch 9 will not disengage, and the drawer will remain locked. Optionally, the device can be set so that once a wrong combination has been entered a predetermined number of times—e.g., three times or five times—the lock can no longer be opened until a predetermined period of time—e.g., fifteen minutes or a half hour—has elapsed. This guards against a person who is in possession of the phone and phone case but does not know the combination and ought not to have access to the integrated phone case contents, simply guessing at one combination after another until a correct combination is entered.

As all of these operations proceed, the electronic processing may also indicate certain items of information to the user on the digital display 172. For example, when the user first enters the combination to lock the safe, the display 172 may show the combination as illustrated in FIG. 18, for a limited time, e.g., five seconds, so that the user can see what was entered and make certain that he or she has not mis-keyed one of the digits. This guards against the situation in which the user has not entered his or her intended combination, does not realize this error, and then finds his or her personal items locked inside the phone chase without the user knowing the correct combination to extract them. Similarly, when the user is unlocking the safe, the digits being entered may be shown on the display 172, so that the user can confirm what he or she is actually entering versus intending to enter, again to guard against mis-keying the combination data. Other information messages, such as "locked" or "open," or various error messages, may also be provided to inform the user of the status of the safe.

Although a ten-plus-two digit keypad has been used in the illustrations of FIGS. 17 and 18, and a four-digit combination modulo 10 has likewise been illustrated, thus again providing $10^4=10,000$ possible combinations, it is to be understood that this is merely a non-limiting example. So too, although the narrative has described a circumstance in which the user can choose and set his or her own safe combination, this does not preclude—and this disclosure explicitly includes—a safe design in which the correct combination is pre-programmed into the device and cannot be changed. Although having a single, unchangeable combination would not be wise for a hotel safe given that it is used by many different people and informing all of these people of a single combination would defeat the purpose of the safe, having one unchanging combination is perfectly acceptable for a personal integrated phone case safe that is owned and used by a single individual.

Further, although an electronic keypad 170 with numbered keys that are physically depressed is illustrated here, and although this keypad 170 is shown to be integral with the phone case 2, there are other options for how to provide this electronics that may also be employed within the scope of this disclosure and its associated claims. As a first alternative, keypad 170 may comprise a touch-screen on the integrated phone case which operates similarly to the touch screen on the phone. As a second alternative, an electronic connection may be provided between the phone and the integrated phone case 2, for example, via the data port of the phone, or preferably, via the Bluetooth connection or another wireless signal of the phone. Then, the computerized instructions for a phone-based locking application can be placed in the phone's electronic and the locking application can itself display a keypad on the telephone touch screen to functionally operate as the keypad 170.

As a third alternative, a voice keypad may be provided which includes the computerized hardware and software required to recognize and respond to vocal utterance by a user. Here too, the electronics for voice recognition and response may be part of the integrated phone case 2 and independent of the phone, or it may be installed as an application on the phone and communicated to the integrated phone case 2 via the phone's data port, or preferably, via the phone's Bluetooth or other wireless signal. With a voice keypad, the available passcodes can become unlimited, because a user can define as a passcode, any vocal utterances, e.g., numbers or words or phrases, which he or she chooses. Supplementary to the voice keypad, or alternatively to the voice keypad as a fourth alternative, voice recognition application software can be configured to require that the user's voice—and only the user's voice—is required as a biometric indicator to open the lock hence the safe. As a fifth alternative, a biometric fingerprint scanner can be used as the keypad, so that only the user's fingerprint can be used to open the safe. As a sixth alternative, a biometric corneal scan of the user's eye may be required to open the safe. And in general, this disclosure and its associated claims contemplate using any type biometric reading that is known or may become known in the art, as the required basis for unlocking the safe. In all of the foregoing cases, providing a correct combination via the electronic keypad 170, or providing the correct biometric data, is the event which serves as the release actuator for releasing the latching extension 52 from the latch 9.

All of these latched and locked embodiments using electronic unlocking may also include the optional latch aid/cover ejection member 68, as illustrated, for the exact same purposes already described in connection with FIGS. 11 through 14.

Figure 21:
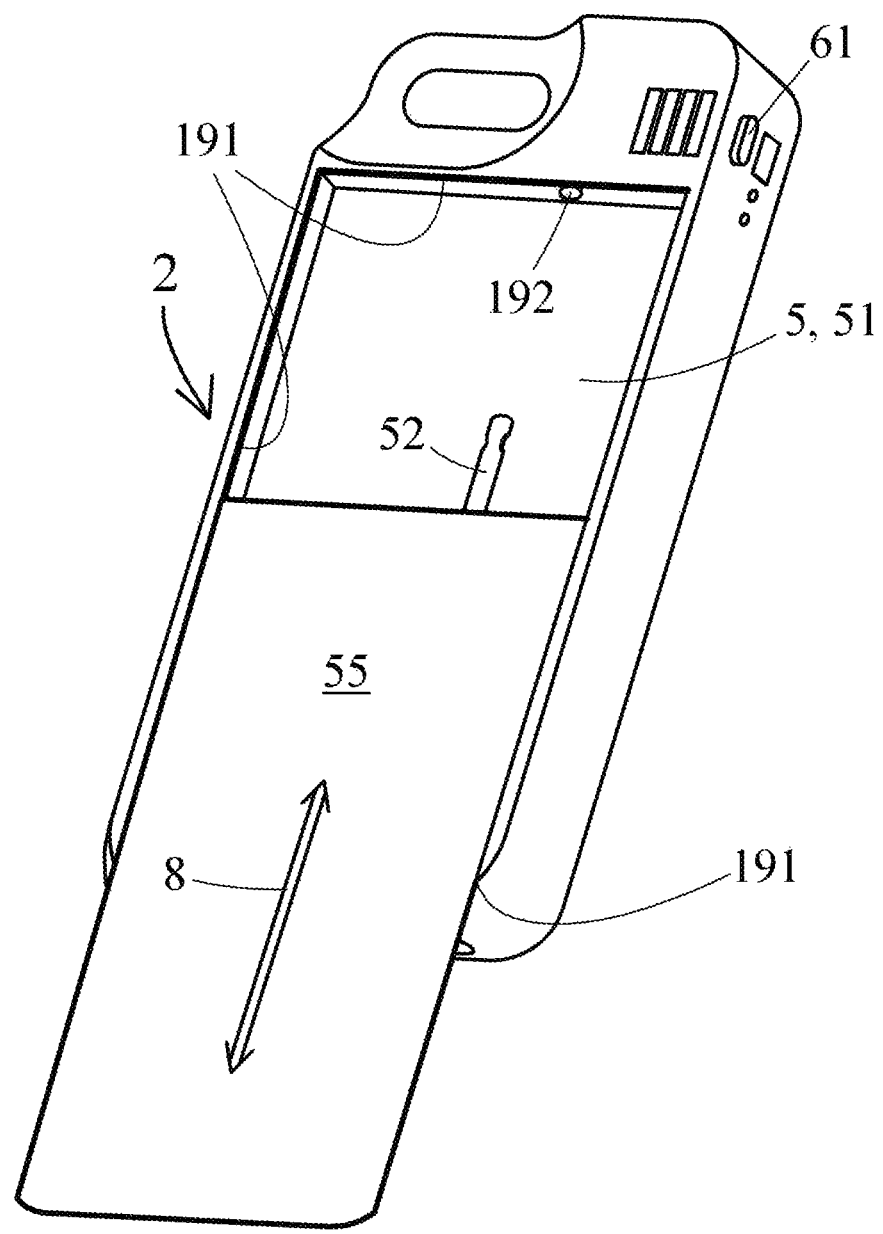
FIG. 21 is right-rear-bottom perspective view of the drawer cover of FIG. 20 being slid on and off of the integrated phone case carriage drawer of FIG. 19.

FIGS. 19 through 22 illustrate another alternative preferred embodiment of the invention in which the back of the integrated phone case 2 shown in FIG. 19 is itself the carriage drawer 5/drawer space 51 into which personal objects are placed, and in which the drawer cover 55 shown in FIG. 20 is now separate from the personal item carriage drawer 5 of FIG. 19, and simply slides 8 on and off the back of the integrated phone case 2 as shown in FIG. 21. Referring to FIG. 19, this embodiment starts with the integrated phone case 2 illustrated from an identical perspective view as that of FIG. 4, but makes several changes: First, the rear surface of the integrated phone case is open and directly accessible, which is why in contrast to FIG. 4, there is no label in FIG. 19 for the rear surface 44. Because rear surface is open, the lines illustrating the drawer space 41 are now solid in contrast to FIG. 4 in which they were represented with hidden lines. Further, while the drawer 5 in FIG. 5 earlier comprised the cover 55 which prevents items stored inside the drawer 5 from being removed, that same surface earlier labelled by 55 is now integral with the integrated phone case 2. So in net effect, what was a separate, removable drawer/drawer space 5, 51 in FIG. 5 is now integrated with the integrated phone case 2, and as in FIG. 5, this drawer space comprises a substantially rectangular cuboidal personal item carriage drawer 5 enclosing five 56 out of six surfaces of the substantially rectangular cuboid with the remaining sixth surface being open. And again, we regard as "substantially" a rectangular cuboid, any rectangular cuboid with curvature at one or more of its corners, or other minor, inconsequential shape variations.

So in sum, referring to FIG. 19, in this embodiment, the drawer space 41 comprises a substantially rectangular cuboidal space bounded by the rear surface 31 of the regular phone protective case 1, an upper surface of the drawer space 41, two side surfaces of the drawer space 41, and a lower surface of the drawer space 41, all of which surfaces are labelled as 56 in FIG. 19 and all of which are closed, and an open rearmost surface of the integrated mobile phone protective case 2 which is open. Visually, it will be seen that the back of the phone case 2 in FIG. 19 simply looks like a drawer or an open carton, with its bottom and all four sides enclosed and its top open.

Figure 22:
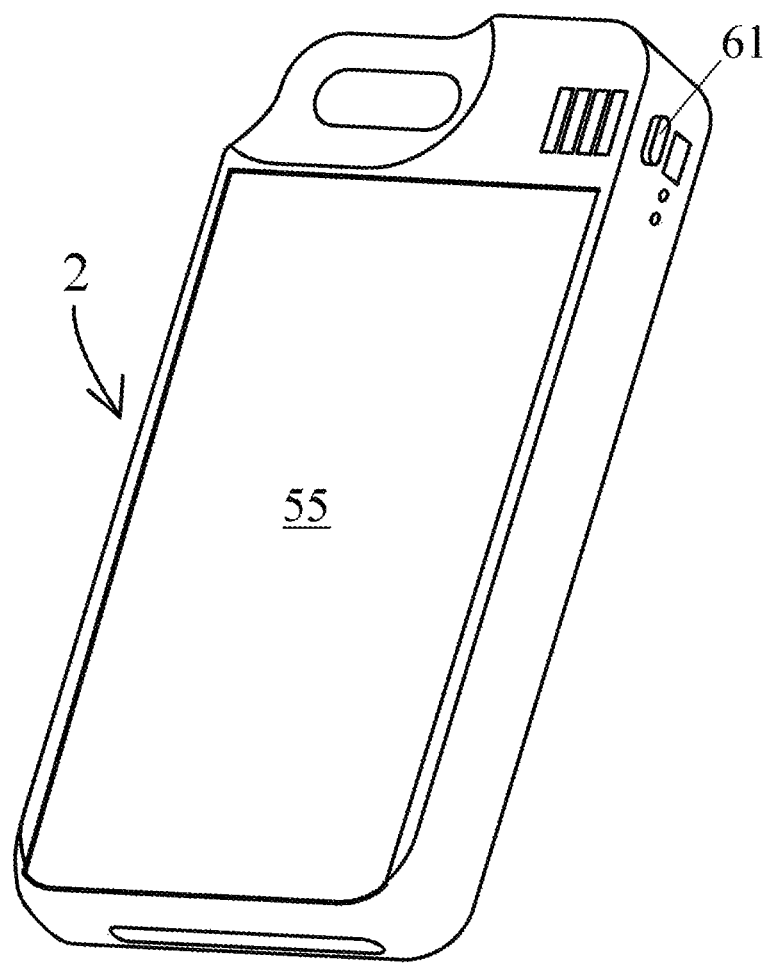
FIG. 22 is right-rear-bottom perspective view of the drawer cover of FIG. 20 after it has been fully slid onto the integrated phone case carriage drawer of FIG. 19 via the sliding illustrated in FIG. 21, and then latched and optionally locked in place.

So in the FIG. 19-22 embodiment, in contrast to what was earlier disclosed in relation to the case configuration of FIGS. 2, 4, 5, 8 and 10, the drawer cover 55 illustrated by FIG. 20 is slid onto the back of the integrated phone case 2 by mating with grooves 191 running alongside and proximate the rear extremity of the integrated phone case 2, as illustrated. In FIG. 21, we see the drawer cover 55 being slid 8 on and off of the integrated phone case 2 through these grooves 191, and it will be appreciated when looking at the bottom extremity of the drawer space 41 in FIG. 19 that once the cover 55 has been slid fully through the grooves 191 as far as possible, the carriage drawer 5/drawer space 51 will be fully enclosed on all four sides, and on its top and bottom, thereby containing any personal object placed inside, as is illustrated by FIG. 22. FIG. 21 should be contrasted with the earlier FIG. 8 showing how the sliding 8 occurs in that embodiment, and FIG. 22 should contrasted with FIG. 10 showing the configuration of that embodiment after the sliding 8 is complete.

As a consequence of this configuration, sliding the drawer cover 55 onto the integrated mobile phone protective case 2 encloses the open rearmost surface (unnumbered but illustrated in FIG. 19) of the integrated mobile phone protective case 2 and thereby encloses all six surfaces of the personal item carriage drawer 5 such that any personal items contained within the personal item carriage drawer 5 become fully enclosed on all sides within the integrated mobile phone protective case 2, as shown in FIGS. 21 and 22.

Insofar as latching the cover drawer cover 55 to the integrated phone case 2 and optionally locking it in place, nothing is changed from what has previously been disclosed, and all that has previously been disclosed applies here as well. In FIG. 20, as in earlier FIG. 5, we see that the latching extension 52 is again integrally affixed with the drawer cover 55, in this embodiment, at an affixation contact 201 which is shown in hidden view because it is below the surface of the cover 55. It will be seen that this latching extension 52 has exactly the same configuration as earlier including latch engagement nook/aperture 53 and an extension topside 54. In the commensurate location below the rear plane of the integrated phone case in FIG. 19, there is a latching extension aperture 192 through which the latching extension 52 will pass once the cover is slid most of the way onto the integrated phone case 2. Inside the top of the integrated phone case, hidden from view in FIG. 19, is the very same latch 9 or locking pin 6 earlier illustrated in FIGS. 9 and 6 respectively, integrally affixed with the mobile phone protective case 2 and configured to mate and latch together with the latching extension 52, and so all operating together in the manner previously discussed at length.

The net result of all this is that sliding the drawer cover 55 onto the integrated mobile phone protective case 2 to enclose the drawer 5 simultaneously latches the latching extension 52 together with the latch 9 (hidden within the upper part of the case 2), thereby preventing the drawer cover 55 from being removed from the integrated mobile phone protective case 2 until the release actuator, which in FIGS. 19 and 21-22 is the release button 61, is actuated to release the latching extension 52 from the latch 9.

If no locking hardware is provided, which is one option, then the cover 55 will simply latch in place without being locked, similarly to what was illustrated in FIGS. 10 through 12. If an optional physical combination lock is provided, then the latching and locking will proceed as shown in FIGS. 13 through 16. If an optional electronic keypad lock is provided, then the locking will proceed in the manner earlier illustrated by FIGS. 17 and 18, with one modification: if an electronic keypad 170 and optional display 172 is integrated onto the cover 55 of FIG. 20, then because the cover in FIG. 20 is physically separate from the integrated phone case 2, some form of data communication must be provided between the cover 55 and the locking mechanism to motivate the actuation 171 of the latch 9. This can be done wirelessly using various known technologies including Bluetooth communication. However, because the cover 55 is inserted into the grooves 191 there will be a region of physical contact between the cover 55 and the integrated phone case 2 when the cover 55 is slid onto the integrated phone case 2. So by providing electronic points of contact between the outer edges 20 of the cover 55 and the grooves 191, whatever data is input through the keypad 170 can be communicated to the integrated phone case 2 in order to actuate the locking mechanism built from the latch 9. All of the alternative forms of electronic locking and unlocking already discussed in relation to FIGS. 17 and 18, apply equally to the embodiment of FIGS. 19-22. This includes but is not limited to: the use of the phone touch screen itself for the entry of any codes that are provided by the user's touch; providing any locking and unlocking software as a computerized application on the user's phone itself in data communication with the phone case 2; and using various forms of biometric user identification for locking and unlocking the phone case 2 safe.

It will be appreciated as to all embodiments which employ both latching and locking, that these embodiments generally comprise a lock for preventing the release actuator from being actuated, and consequently for preventing the release of the latching extension 52 from the latch 6, 9 and consequently the removal of the drawer cover 55 (See FIGS. 5 and 20) from the integrated mobile phone protective case 2 so that that any personal items contained within the personal item carriage drawer 5 (see FIGS. 5 and 19) can be accessed, until the user has supplied correct credentials to unlock the lock. In the embodiments that employ the physical combination lock of FIGS. 13-16, those credentials are supplied by rotating the lock disks 7 to the correct combination, upon which the release button 61 can be depressed. In the embodiments that employ the electronic keypad 170, those credentials are supplied by keying the correct combination into the keypad. In embodiments employing a voice keypad, those credentials are supplied by the vocal utterance of a correct passcode or passphrase into the voice keypad. And in embodiments that employ biometric security, those credentials are supplied by presentation to the system of the correct biometric data.

We finally refer to FIG. 22, which shows the drawer cover 55 after it has been fully slid onto the integrated phone case carriage drawer 5, 51 of FIG. 19, and latched and optionally locked in place. It will be appreciated how in this configuration, after the drawer cover 55 has been slid onto the mobile phone protective case 2, all six surfaces of the substantially rectangular cuboidal personal item carriage drawer 5, 51 which is now hidden from external view, become enclosed such that any personal items contained within the personal item carriage drawer 5, 51 become fully enclosed on all sides within the mobile phone protective case 2. This is just as occurred in the earlier alternative embodiment illustrated by FIG. 10.

It will also be appreciated how after the drawer cover 55 of FIG. 20 has been slid onto said mobile phone protective case 2, the latching extension 52 becomes latched together with the latch 9 (hidden from view in FIGS. 19, 21 and 22) thereby preventing the drawer cover 55 from being removed from the mobile phone protective case 2 until the release actuator (in FIG. 22 the release button 61) is actuated to release the latching extension 52 from the latch 9. It will likewise be appreciated how when the latching extension 52 is latched together with the latch 9, any personal items contained within the personal item carriage drawer 5, 51 within the mobile phone protective case 2 cannot be removed from the drawer 5, 51 and the integrated case 2. Finally, these embodiments of FIGS. 19-22 may also include the optional latch aid/cover ejection member 68, as illustrated, for the exact same purposes previously described in relation to in the case embodiment of FIGS. 2, 4, 5, 8 and 10.

The case embodiment of FIGS. 19-22 has the advantage that it adds only one more planar surface—namely the cover 55 in the embodiment illustrated by FIG. 20—behind and parallel to the rear surface 31 of the regular protective case 1. This optimizes the physical storage space behind the rear surface 31 of the prior phone protective case more efficiently than the embodiment of FIGS. 2, 4, 5, 8 and 10 which add two new surfaces—namely the rear surface 44 in FIG. 4 as well as the planar surface 56 at the bottom of the drawer 5 in FIG. 5—behind and parallel to the rear surface 31 of the regular protective case 1. On the other hand, because the drawer 5 of FIG. 5 is an entirely separate component of the system from the phone case 2, there is a user convenience advantage in the embodiment of FIGS. 2, 4, 5, 8 and 10 because the personal items can be left in the drawer 5 while the drawer 5 rests on a horizontal surface such as a desk or table even while the drawer has been removed from the phone and the phone in the separate phone case is otherwise being used (for example, while the user is making a call in a hotel room or his or her home or another other safe space while the drawer 5 with some personal items sits separately on a nearby surface). Conversely, for the embodiment of FIGS. 19-22 the drawer 5 will always travel with the phone and phone case 2 and so cannot be separately placed on a horizontal surface with the personal items accessible while the phone is in use. The selection of one of these embodiments versus the other by a consumer thus becomes a matter of personal preference.

It will be understood that particularly for all of the invention embodiments which include latching and locking, that the system and apparatus disclosed herein effectively constitutes a small portable safe, which safe is part of the phone case protecting the user's mobile phone, and which safe can also house and secure small personal items therewithin, simultaneously with the housing and protecting the phone. Because as noted in the background of the invention, users are generally highly attentive to their mobile phones, this decreases the chances that items stored within this portable, personal safe will be lost or forgotten, in addition to helping secure those items against theft.

It will also be appreciated once a personal item carriage drawer 5 has been provided in connection with an integrated phone protective case apparatus 2 is the manner heretofore disclosed, that it also is possible to design and provide certain partition accessories, not illustrated here, which can be used to partition the drawer space into smaller segments for storing particular personal items. For example, segmenting the drawer into seven (7) sections might be used to provide storage for one week's worth of pills consumed by the user. Or, without limitation, a suitably-shaped section of the drawer 5 may be used for keys, or coins, or currency, or jewelry, or phone accessories, etc. All such partition structures that may introduced into the drawer 5 either directly or via accessory structures, are understood to also fall within the scope of this disclosure and its associated claims.

Finally, it is understood that while the description and the drawings have been developed to show the drawer cover 55 sliding 8 on and off of the phone case 2 in several embodiments, it is understood that such sliding 8 is a specific type of mating between the drawer cover 55 and the phone case 2 within the scope of this disclosure and the associated claims. So, for example, referring to FIG. 21, it is understood that a person of ordinary skill might substitute an embodiment in which the cover 55 does not technically "slide" on and off of the case through grooves 191, but in rather which the user inserts the latching extension 52 through the latching extension aperture 192 with the plane of the cover 55 not parallel to the plane of the phone case 2, and then presses to bottom of the phone cover 55 down to bring it parallel and latch it to the phone case 2 not only via latching extension 52, but also through a second latch provided near the bottom of the phone case 2. Likewise, it is expected that a person of ordinary skill might provide other embodiments which do not technically involve "sliding," but rather, a mechanism equivalent to sliding that can be used to latch and optionally lock this drawer 5 into the integrated phone case 2 to achieve an equivalent result.

Consequently, the more general characterization of the invention is as an integrated mobile phone protective case and carrier drawer system and related apparatus and method wherein, in an unmated configuration, one of six sides of the back of the phone case 2 is open and five of the six sides are closed. Then, when a drawer cover 55 separate from the case 2 is mated and latched and optionally locked onto the case 2, that one open side becomes closed as well and items inside cannot be thereafter extracted without unlatching and, if locked, unlocking. The illustrated "sliding" is therefore understood to be a specific subset of the more general operation of "mating."

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. An integrated mobile phone protective case and carrier drawer system for securely containing small personal items, comprising:

a regular mobile phone protective case portion of said integrated mobile phone protective case configured to receive and hold a mobile phone within a phone housing space thereof, and configured once a mobile phone has been placed therein to surround and protect the mobile phone using a back surface, a top surface, a bottom surface, and two side surfaces of said regular case portion, but configured to leave a front surface of the mobile phone accessible to a user's vision and touch;

a drawer space integrally contained inside a rear part of said integrated mobile phone protective case, said drawer space comprising a substantially rectangular cuboid enclosing five out of six surfaces of said substantially rectangular cuboid with the remaining sixth surface being open;

a personal item carriage drawer comprising a substantially rectangular cuboid enclosing five out of six surfaces of said substantially rectangular cuboid with the remaining sixth surface being open;

a drawer cover separate from said integrated mobile phone protective case, configured to mate onto said rear part of said integrated mobile phone protective case, wherein after said drawer cover has been mated onto said integrated mobile phone protective case, said system becomes configured such that all six surfaces of said personal item carriage drawer become enclosed such that any personal items contained within said personal item carriage drawer become fully enclosed on all sides within said integrated mobile phone protective case;

a latching extension integrally affixed with said drawer cover;

a latch integrally affixed with said integrated mobile phone protective case and configured to latch together with said latching extension; and a release actuator for releasing said latching extension from said latch; wherein:

after said drawer cover has been mated onto said integrated mobile phone protective case, said latching extension simultaneously becomes latched together with said latch thereby preventing said drawer cover from being removed from said integrated mobile phone protective case until said release actuator is actuated to release said latching extension from said latch;

when said latching extension is latched together with said latch, any personal items contained within said personal item carriage drawer within said integrated mobile phone protective case cannot be removed from said drawer; and when said release actuator is actuated, said latching extension is released from said latch in response thereto, so that said drawer cover can be removed from said integrated mobile phone protective case and any personal items contained within said personal item carriage drawer can then be removed from said drawer.

2. The system of claim 1, said configuration to mate comprising a configuration to slide.

3. The system of claim 1, further comprising:

said drawer space comprising a substantially rectangular cuboidal space bounded by a rearmost surface of said integrated mobile phone protective case, a rear surface of said regular case portion, an upper surface of said drawer space, two side surfaces of said drawer space, all of which surfaces are closed, and a carriage drawer opening which is open;

said personal item carriage drawer being separate from said drawer space and configured to mate and fit into said drawer space, with a bottom one of said five surfaces of said carriage drawer comprising said drawer cover; wherein:

said drawer space and said personal item carriage drawer are configured such that mating said personal item carriage drawer into said drawer space simultaneously mates said drawer cover onto said integrated mobile phone protective case such that all six surfaces of said personal item carriage drawer become enclosed such that any personal items contained within said personal item carriage drawer become fully enclosed on all sides within said integrated mobile phone protective case; and mate said personal item carriage drawer into said drawer space also simultaneously latching said latching extension together with said latch thereby preventing said personal item carriage drawer and said drawer cover from being removed from said integrated mobile phone protective case until said release actuator is actuated to release said latching extension from said latch.

4. The system of claim 1, further comprising:

said drawer space comprising a substantially rectangular cuboidal space bounded by a rear surface of said regular case portion, an upper surface of said drawer space, two side surfaces of said drawer space, and a lower surface of said drawer space, all of which surfaces are closed, and an open rearmost surface of said integrated mobile phone protective case which is open;

said personal item carriage drawer being one and the same as said drawer space;

said drawer cover being separate from said personal item carriage drawer and configured such that mating said drawer cover onto said integrated mobile phone protective case encloses said open rearmost surface of said integrated mobile phone protective case and thereby encloses all six surfaces of said personal item carriage drawer such that any personal items contained within said personal item carriage drawer become fully enclosed on all sides within said integrated mobile phone protective case; and mating said drawer cover onto said integrated mobile phone protective case simultaneously latches said latching extension together with said latch thereby preventing said drawer cover from being removed from said integrated mobile phone protective case until said release actuator is actuated to release said latching extension from said latch.

5. The system of claim 1, further comprising a latch aid/cover ejection member of said integrated mobile phone protective case, for ejecting said drawer cover at least partially from said integrated mobile phone protective case in response to actuating said release actuator.

6. The system of claim 1, said carrier drawer providing a portable safe, further comprising a lock for preventing said release actuator from being actuated to release said latching extension from said latch, until the user has supplied correct credentials to unlock said lock.

7. The system of claim 6, said lock comprising a physical combination lock which must be physically moved to said correct credentials comprising a correct lock combination, before the user can actuate said release actuator.

8. The system of claim 6, said release actuator comprising an electronic keypad which unlocks and releases said latching extension from said latch, only in response to receiving said correct credentials comprising a correct combination.

9. The system of claim 6, said release actuator comprising a voice keypad which unlocks and releases said latching extension from said latch, only in response to receiving said correct credentials comprising a correct vocal utterance.

10. The system of claim 6, said release actuator comprising a biometric keypad which unlocks and releases said latching extension from said latch, only in response to receiving said correct credentials comprising correct biometric data.

11. A method for securely containing small personal items within an integrated mobile phone protective case and carrier drawer system, comprising:

placing a mobile phone into a regular mobile phone protective case portion of said integrated mobile phone protective case, said regular case portion configured to receive and hold a mobile phone within a phone housing space thereof, and thereby surrounding and protecting the mobile phone with a back surface, a top surface, a bottom surface, and two side surfaces of said regular case portion, while leaving a front surface of the mobile phone accessible to a user's vision and touch;

providing a drawer space integrally contained inside a rear part of said integrated mobile phone protective case, said drawer space comprising a substantially rectangular cuboid enclosing five out of six surfaces of said substantially rectangular cuboid with the remaining sixth surface being open;
providing a latch integrally affixed with said integrated mobile phone protective case;
providing a personal item carriage drawer comprising a substantially rectangular cuboid enclosing five out of six surfaces of said substantially rectangular cuboid with the remaining sixth surface being open;
mating a drawer cover separate from said integrated mobile phone protective case onto said rear part of said integrated mobile phone protective case, and as a consequence, enclosing all six surfaces of said personal item carriage drawer and thereby fully enclosing on all sides within said integrated mobile phone protective case, any personal items contained within said personal item carriage drawer;
providing a latching extension integrally affixed with said drawer cover and configured to latch together with said latch; and
by mating said drawer cover onto said rear part of said integrated mobile phone protective case, preventing said drawer cover from being removed from said integrated mobile phone protective case by simultaneously latching said latching extension latching together with said latch, such that any personal items contained within said personal item carriage drawer within said integrated mobile phone protective case cannot be removed from said drawer so long as said latching extension remains latched together with said latch.

12. The method of claim 11, said mating comprising sliding.

13. The method of claim 11, further comprising:
releasing said latching extension from said latch in response to actuating a release actuator for releasing said latching extension from said latch; and
thereafter removing said drawer cover from said integrated mobile phone protective case so that any personal items contained within said personal item carriage drawer can then be removed from said drawer.

14. The method of claim 13, further comprising ejecting said drawer cover at least partially from said integrated mobile phone protective case in response to actuating said release actuator, using a latch aid/cover ejection member of said integrated mobile phone protective case.

15. The method of claim 11, further comprising:
providing said drawer space comprising a substantially rectangular cuboidal space bounded by a rearmost surface of said integrated mobile phone protective case, a rear surface of said regular phone protective case, an upper surface of said drawer space, two side surfaces of said drawer space, all of which surfaces are closed, and a carriage drawer opening which is open;
providing said personal item carriage drawer separately from said drawer space, a bottom one of said five surfaces of said carriage drawer comprising said drawer cover;
mating said personal item carriage drawer into said drawer space and thereby simultaneously mating said drawer cover onto said integrated mobile phone protective case, and as a consequence, enclosing all six surfaces of said personal item carriage drawer and thereby fully enclosing on all sides within said integrated mobile phone protective case, any personal items contained within said personal item carriage drawer; and
by mating said personal item carriage drawer into said drawer space, preventing said personal item carriage drawer and said drawer cover from being removed from said integrated mobile phone protective case by simultaneously latching said latching extension together with said latch, such that any personal items contained within said personal item carriage drawer within said integrated mobile phone protective case cannot be removed from said drawer so long as said latching extension remains latched together with said latch.

16. The method of claim 11, further comprising:
providing said drawer space comprising a substantially rectangular cuboidal space bounded by a rear surface of said regular phone protective case, an upper surface of said drawer space, two side surfaces of said drawer space, and a lower surface of said drawer space, all of which surfaces are closed, and an open rearmost surface of said integrated mobile phone protective case which is open;
providing said personal item carriage drawer wherein said personal item carriage drawer is one and the same as said drawer space;
mating a drawer cover separate from said personal item carriage drawer onto said integrated mobile phone protective case, and as a consequence, enclosing said open rearmost surface of said integrated mobile phone protective case and thereby enclosing all six surfaces of said personal item carriage drawer and thereby fully enclosing on all sides within said integrated mobile phone protective case, any personal items contained within said personal item carriage drawer; and
by mating said drawer cover onto said integrated mobile phone protective case, preventing said drawer cover from being removed from said integrated mobile phone protective case by simultaneously latching said latching extension together with said latch, such that any personal items contained within said personal item carriage drawer within said integrated mobile phone protective case cannot be removed from said drawer so long as said latching extension remains latched together with said latch.

17. The method of claim 13, further comprising said carrier drawer providing a portable safe by preventing said release actuator from being actuated to release said latching extension from said latch using a lock therefor, until the user has supplied correct credentials to unlock said lock.

18. The method of claim 17, further comprising physically moving said lock comprising a physical combination lock to said correct credentials comprising a correct lock combination, before the user can actuate said release actuator.

19. The method of claim 17, further comprising providing said correct credentials comprising a correct combination to said release actuator comprising an electronic keypad which unlocks and releases said latching extension from said latch, only in response to receiving said correct combination.

20. The method of claim 17, further comprising providing said correct credentials comprising a correct vocal utterance to said release actuator comprising a voice keypad which unlocks and releases said latching extension from said latch, only in response to receiving said correct vocal utterance.

21. The method of claim 17, further comprising providing said correct credentials comprising correct biometric data to said release actuator comprising a biometric keypad which unlocks and releases said latching extension from said latch, only in response to receiving said correct biometric data.

* * * * *